US012542075B2

(12) United States Patent
Robbers et al.

(10) Patent No.: US 12,542,075 B2
(45) Date of Patent: Feb. 3, 2026

(54) TAMPER-EVIDENT LABEL AND ITEM AUTHENTICATION SYSTEM

(71) Applicant: Auquin Inc., San Diego, CA (US)

(72) Inventors: Rob Robbers, Solana Beach, CA (US); John Milito, Daniel Island, CA (US)

(73) Assignee: Auquin Inc., San Diego, CA (US)

( * ) Notice: Subject to any disclaimer, the term of this patent is extended or adjusted under 35 U.S.C. 154(b) by 0 days.

(21) Appl. No.: 19/002,040

(22) Filed: Dec. 26, 2024

(65) Prior Publication Data

US 2025/0218312 A1 Jul. 3, 2025

Related U.S. Application Data

(60) Provisional application No. 63/616,219, filed on Dec. 29, 2023.

(51) Int. Cl.

*G09F 3/00* (2006.01)
*G09F 3/02* (2006.01)
*G09F 3/10* (2006.01)

(52) U.S. Cl.

CPC .......... *G09F 3/0292* (2013.01); *G09F 3/0297* (2013.01); *G09F 3/10* (2013.01);
(Continued)

(58) Field of Classification Search

CPC ........ G09F 3/0292; G09F 3/00; G09F 3/0297; G09F 3/10; G09F 2003/0208; G09F 3/02; G09F 2003/0267; G09F 2003/0277
(Continued)

(56) References Cited

U.S. PATENT DOCUMENTS

| | | | |
|---|---|---|---|
| 6,308,891 | B1 | 10/2001 | Regev |
| 7,375,891 | B1 | 5/2008 | Conley |

(Continued)

FOREIGN PATENT DOCUMENTS

| | | | |
|---|---|---|---|
| KR | 1020080007592 | A | 1/2008 |
| KR | 101728400 | B1 | 4/2017 |

(Continued)

OTHER PUBLICATIONS

U.S. Appl. No. 18/155,219, Non Final Office Action mailed Jul. 15, 2025, 41 pgs.

(Continued)

*Primary Examiner* — Justin V Lewis
(74) *Attorney, Agent, or Firm* — Polygon IP, LLP

(57) ABSTRACT

A tamper-evident item authentication label may include a substrate layer that includes a first substrate side and a second substrate side, a first adhesive layer, a second adhesive layer, a first unique indicium, a second unique indicium, and a plurality of cuts across the first unique indicium and the second unique indicium extending through at least a portion of a thickness of the substrate layer. The adhesive layers may be deposited on the substrate sides and arranged to fuse the tamper-evident item authentication label with a first and second surface. The first unique indicium may be deposited on the substrate layer and encoding a first unique identifier that links the tamper-evident item authentication label to one or more records in a remote database system. The second unique indicium may be deposited on the substrate layer. The second unique indicium may include a stochastically created visual pattern.

18 Claims, 16 Drawing Sheets

(52) U.S. Cl.
CPC ................ *G09F 2003/0208* (2013.01); *G09F 2003/0267* (2013.01); *G09F 2003/0277* (2013.01)

(58) Field of Classification Search
USPC ........ 283/61, 62, 67, 70, 72, 74, 79, 81, 93, 283/94, 98, 100, 101, 103, 104, 105, 107, 283/108, 901
See application file for complete search history.

(56) References Cited

U.S. PATENT DOCUMENTS

| | | | |
|---|---|---|---|
| 8,347,097 | B2 | 1/2013 | Lapstun et al. |
| 9,773,141 | B2 | 9/2017 | Kozicki |
| 9,830,604 | B2 | 11/2017 | Aljawhari |
| 10,074,000 | B2 | 9/2018 | Kozicki |
| 11,170,190 | B2 | 11/2021 | Kozicki |
| 11,367,071 | B2 | 6/2022 | Gonzales, Jr. et al. |
| 2005/0230960 | A1 | 10/2005 | Bilodeau et al. |
| 2009/0249850 | A1 | 10/2009 | Baud et al. |
| 2011/0240739 | A1 | 10/2011 | Delaigle et al. |
| 2012/0203663 | A1 | 8/2012 | Sinclair et al. |
| 2014/0135042 | A1 | 5/2014 | Buchheim et al. |
| 2014/0301626 | A1 | 10/2014 | Kerschner et al. |
| 2015/0128694 | A1 | 5/2015 | Shankman |
| 2016/0012498 | A1 | 1/2016 | Prasad |
| 2018/0108024 | A1 | 4/2018 | Greco et al. |
| 2018/0300978 | A1 | 10/2018 | Pinnow |
| 2019/0135501 | A1* | 5/2019 | Chandra .......... G06K 19/07798 |
| 2019/0371107 | A1 | 12/2019 | Blau |
| 2019/0392457 | A1 | 12/2019 | Kuntagod et al. |
| 2020/0059363 | A1 | 2/2020 | Lobo et al. |
| 2020/0143374 | A1 | 5/2020 | Pitz et al. |
| 2020/0151738 | A1 | 5/2020 | Guinard et al. |
| 2020/0274550 | A1 | 8/2020 | St. John |
| 2021/0241269 | A1 | 8/2021 | Dunjic et al. |
| 2021/0390501 | A1 | 12/2021 | Loupos et al. |
| 2022/0018034 | A1 | 1/2022 | Jiang et al. |
| 2022/0222681 | A1 | 7/2022 | Anastas |
| 2022/0326186 | A1 | 10/2022 | Kayyod |
| 2023/0004975 | A1 | 1/2023 | Kohli |
| 2023/0246830 | A1 | 8/2023 | Hakim |
| 2024/0378626 | A1 | 11/2024 | Ryle et al. |

FOREIGN PATENT DOCUMENTS

| | | | |
|---|---|---|---|
| KR | 1020240003569 | A | 1/2024 |
| WO | 2025144906 | A1 | 7/2025 |

OTHER PUBLICATIONS

U.S. Appl. No. 18/155,226, Final Office Action mailed Aug. 7, 2025, 15 pgs.
U.S. Appl. No. 18/155,226, Non Final Office Action mailed Feb. 25, 2025, 43 pgs.
International Application Serial No. PCT/US24/61925, Search Report and Written Opinion mailed Apr. 16, 2025, 9 pgs.

* cited by examiner

TAMPER-EVIDENT LABEL AND ITEM AUTHENTICATION SYSTEM

CROSS-REFERENCE TO RELATED APPLICATIONS

This application claims the benefit under 35 U.S.C. § 119(e) of U.S. Provisional Patent Application 63/616,219 by Robbers et al., titled: "Tamper-Evident Label and Item Authentication System", filed on Dec. 29, 2023, which is incorporated herein by reference in its entirety for all purposes.

FIELD OF TECHNOLOGY

This patent application relates generally to labels, and more specifically to tamper-evident item authentication labels.

BACKGROUND

Item authentication and provenance verification is particularly important for relatively small, valuable items such as bullion, collectable coins, collectable cards, pharmaceuticals, luxury goods, alcoholic beverages, and more. Trade in such items typically relies on belief in authenticity. However, the value of such items renders them prone to counterfeiting, substitution, alteration, smuggling, and other such illicit activities. Although various conventional techniques attempt to address these problems, they nevertheless remain commonplace. Accordingly, improved techniques and mechanisms for item authentication and provenance verification are desired.

SUMMARY

According to various embodiments, techniques, products, and mechanisms described herein relate to a tamper-evident item authentication label, an item package, and various authentication and provenance verification methods.

In some embodiments, a tamper-evident item authentication label may include one or more of: a substrate layer that includes a first substrate side and a second substrate side; a first adhesive layer deposited on the first substrate side and arranged so as to fuse the tamper-evident item authentication label with a first surface; a second adhesive layer deposited on the second substrate side and arranged so as to fuse the tamper-evident item authentication label with a second surface; a first unique indicium deposited on the substrate layer and encoding a first unique identifier that links the tamper-evident item authentication label to one or more records in a remote database system; a second unique indicium deposited on the substrate layer, the second unique indicium comprising a stochastically created visual pattern; and a plurality of cuts extending across the first unique indicium and the second unique indicium through at least a portion of a thickness of the substrate layer.

In some embodiments, the first and second adhesive layers together include a first region composed of a first type of adhesive having a first level of cohesion, and wherein the first and second adhesive layers together include a second region composed of a second type of adhesive having a second level of cohesion greater than the first level of cohesion.

In some embodiments, the first type of adhesive is a temporary low-cohesion adhesive. Alternatively, or additionally, the second type of adhesive may be a permanent high-cohesion adhesive.

In some embodiments, the tamper-evident item authentication label may include a first cover layer removably attached to the first adhesive layer; and a second cover layer removably attached to the second adhesive layer.

In some embodiments, the tamper-evident item authentication label may also include a pocket disposed in an air-tight film, the pocket including an inert gas and a color-changing substance, the color-changing substance being of a first color when not exposed to air and changing to a second color different from the first color when exposed to air.

In some embodiments, the first adhesive layer is arranged in a first pattern, and wherein the second adhesive layer is arranged in a second pattern that is different from the first pattern, the first and second patterns being arranged to facilitate breakage across the first unique indicium and the second unique indicium.

In some embodiments, the second unique indicium includes a dendritic structure including a plurality of members extending away from a common point of the dendritic structure to form a stochastically branched arrangement of the plurality of members.

In some embodiments, the second unique indicium includes one or more of: a microdot, a micromirror array, a pattern printed in optical ink with suspended crystals, a pattern printed in optical ink with suspended metallic flakes, a microtexture, a microstructure, a region printed using a dye that reveals a stochastically created pattern, and a stochastically created QR code pattern.

In some embodiments, an item package may include one or more of a first item case portion including a first surface; a second item case portion a second surface; a tamper-evident item authentication label including one or more of a substrate layer that includes a first substrate side and a second substrate side, a first adhesive layer deposited on the first substrate side and arranged so as to fuse the tamper-evident item authentication label with the first surface, a second adhesive layer deposited on the second substrate side and arranged so as to fuse the tamper-evident item authentication label with the second surface, a first unique indicium deposited on the substrate layer and encoding a first unique identifier that links the tamper-evident item authentication label to one or more records in a remote database system, a second unique indicium deposited on the substrate layer and comprising a stochastically created visual pattern, and a plurality of cuts across the first unique indicium and the second unique indicium extending through at least a portion of a thickness of the substrate layer; and an item removably sealed between the first item case portion and the second item case portion.

In some embodiments, the first and second adhesive layers together include a first region composed of a first type of adhesive having a first level of cohesion, and wherein the first and second adhesive layers together include a second region composed of a second type of adhesive having a second level of cohesion greater than the first level of cohesion.

In some embodiments, the first type of adhesive is a temporary low-cohesion adhesive, and wherein the second type of adhesive is a permanent high-cohesion adhesive.

In some embodiments, the item package may include a pocket disposed in an air-tight film, the pocket including an inert gas and a color-changing substance, the color-changing substance being of a first color when not exposed to air and changing to a second color different from the first color when exposed to air.

In some embodiments, the first adhesive layer is arranged in a first pattern, wherein the second adhesive layer is arranged in a second pattern that is different from the first pattern, the first and second patterns being arranged to facilitate breakage across the first unique indicium and the second unique indicium.

In some embodiments, the second unique indicium comprises a dendritic structure including a plurality of members extending away from a common point of the dendritic structure to form a stochastically branched arrangement of the plurality of members.

In some embodiments, the second unique indicium is selected from a group consisting of: a microdot, a micromirror array, a pattern printed in optical ink with suspended crystals, a pattern printed in optical ink with suspended metallic flakes, a microtexture, a microstructure, a region printed using a dye that reveals a stochastically created pattern, and a stochastically created QR code pattern.

In some embodiments, the first unique indicium is composed of cured ink, and wherein the first unique indicium is attached to the first item case portion via ultrasonic welding.

In some embodiments, a method may include operations such as receiving from a remote computing device a request to authenticate an item based on sensor data determined by scanning a label affixed to the item; determining a first identifier value based on a first unique indicium included on the label and captured in the sensor data; determining a second identifier value based on a second unique indicium included on the label and captured in the sensor data, the second unique indicium comprising a stochastically created visual pattern; retrieving an item authentication record from a database table, the item authentication record including the first identifier value and a third reference identifier value, the item authentication record being uniquely identified by the first identifier value; determining via a processor whether the second identifier value matches the third reference identifier value; and transmitting the remote computing device a response message indicating authentication of the item upon determining that the second identifier value matches the third reference identifier value.

In some embodiments, the second unique indicium may include a dendritic structure including a plurality of members extending away from a common point of the dendritic structure to form a stochastically branched arrangement of the members.

In some embodiments, the second unique indicium may include one or more of: a microdot, a micromirror array, a pattern printed in optical ink with suspended crystals, a pattern printed in optical ink with suspended metallic flakes, a microtexture, a microstructure, a region printed using a dye that reveals a stochastically created pattern, and a stochastically created QR code pattern.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods, and computer program products for item labeling, identification, authentication, and provenance verification. These drawings in no way limit any changes in form and detail that may be made by one skilled in the art without departing from the spirit and scope of the disclosed implementations.

DETAILED DESCRIPTION

Figure 1:
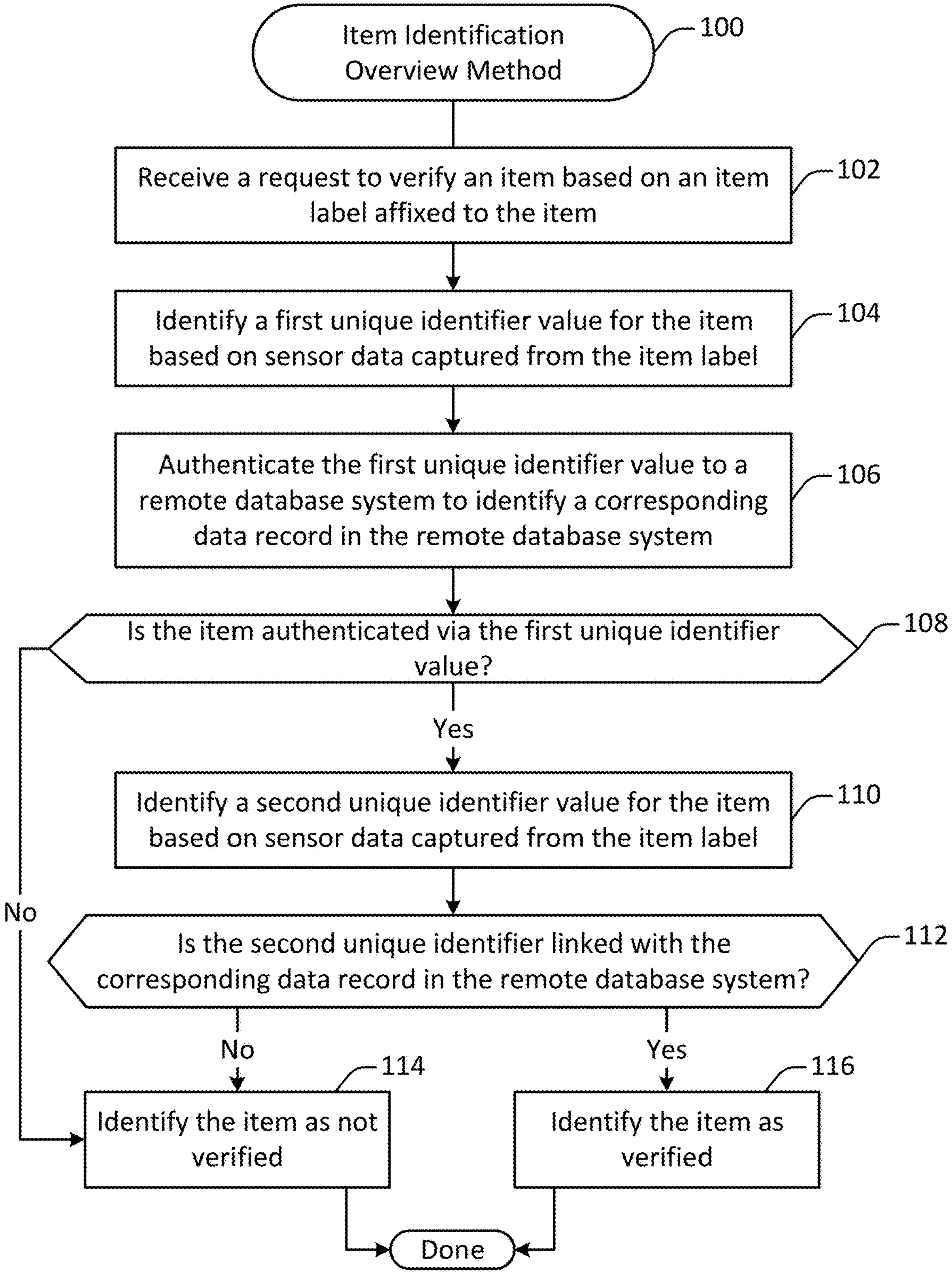
FIG. 1 illustrates an overview method for identifying an item, performed in accordance with one or more embodiments.

Techniques and mechanisms described herein provide for item authentication and provenance verification. According to various embodiments, an item label may be configured with two different identifier indicia that each may be scanned to determine a respective identifier. The two different identifiers each may link to a database record stored in a remote database system and corresponding with the item to which the label is affixed. For example, one item identifier indicium may provide a unique value for locating the database record, for instance encoded as a QR code. As another example, another item identifier indicium may be impossible to reproduce. Additionally, the item label may be tamper-evident, for instance via a combination of die-cut lines and adhesive portions, such that the item label may not be removed without distorting the two item identifier indicia. In this way, the item label may uniquely identify the item and may not be removed once applied, providing both the item's identity and evidence that the item has not been tampered with.

In some embodiments, as discussed herein, the item label may include an identifier indicium configured so as to render the identifier indicium effectively impossible to reproduce. For instance, the identifier indicium may be a stochastically applied image such as a dendritic structure that includes complex features at different levels of detail. The dendritic structure may include, for example, a plurality of members extending away from a common point of the dendritic structure to form a stochastically branched arrangement of the members. When using commonly available printing techniques, such an indicium may be difficult or impossible to accurately reproduce with fidelity sufficient to appear indistinguishable to conventional cameras. Alternatively, another type of non-reproducible item indicium may be used, such as a pattern of particles randomly embedded in the ink during the printing process.

In some embodiments, the item label may include one or more security features that lead to the destruction of the integrity of the item upon tampering. For instance, the item label may include one or more adhesive portions allowing the item label to be affixed to one or more surfaces. The item label may also include one or more peel-destructive die-cuts preventing the intact removal of the item label from a surface to which it is affixed. Alternatively, or additionally, the item label may include a substance that is enclosed in an inert gas pocket and that changes color when exposed to air, such that removal of the item label from a surface to which it is affixed would result in the disruption of the integrity of the inert gas pocket and cause the substance to change colors.

In some embodiments, a security and authentication label, also referred to herein as an "item label" is securely applied to an object. For instance, the item label may be sandwiched between an item container and one or more transparent case elements. As one example, the item label may be able to fuse and secure the integrity of two clear clamshell pieces and an internal gasket that holds one or more objects such as coins, pharmaceuticals, collectable cards, or the like. As another example, the item label may fuse to itself, for instance to form a ring that can be wrapped around a handbag strap, alcohol bottle neck, or other such item. As yet another example, the item label may be able to fuse to two different objects, such as the cap and container portions of a pharmaceutical vial.

According to various embodiments, the item label may include one or more multi-purpose adhesives, for instance on each side. The multi-purpose adhesives may include adhesives having different levels of cohesion. For instance, the multi-purpose adhesives may include a more temporary low-cohesive tack layer and a more permanent high-cohesive glue layer.

In some embodiments, one or more adhesive connections may be accomplished by ultrasonic welding. For instance, cured ink may be used for one or more unique identifiers. Then, ultrasonic welding may force partial adhesion of the unique identifier to the case and item label.

In some embodiments, one or more adhesive connections may rely on an external seal. For instance, in the case of a ring that is formed by the item label around the neck of an alcohol bottle, an additional foil layer may be placed atop the item label and then fused to itself and/or the item label.

In some embodiments, the item label may be deployed via a double-sided "peel and place" process, which may facilitate rapid, consistent, and label waste (i.e., error) reducing permanent placement.

In some embodiments, a label may be made a tamper-evident label, for instance via peel-destructive die-cuts. Such a configuration may be enhanced by an inert gas pocket, for instance, trapped between two air-tight films that are permanently destroyed when the item label is separated from a surface to which it is adhered. The inert gas pocket may include a color-changing substance that changes colors when exposed to air. In such a configuration, the separation of the label from a surface to which it is adhered may trigger the color-changing substance to change colors, indicating that the integrity of the item label has been destroyed.

FIG. 1 illustrates an overview method 100 for identifying an item, performed in accordance with one or more embodiments. In some embodiments, the method 100 may be performed at one or more devices in a system such as that shown in FIG. 2.

In some embodiments, one or more of the operations shown in FIG. 1 may be performed via a native application at a mobile computing device, such as a dedicated item label authentication application. Alternatively, or additionally, one or more operations shown in FIG. 1 may be performed via a web application. As still another possible, one or more operations shown in FIG. 1, such as determining an identifier via sensor data, may be performed by a sensor device and/or control software for the sensor device.

A request to verify an item based on an item label affixed to the item is received at 102. In some embodiments, the request may be generated at a computing device configured as a verification device. The verification device may be a general-purpose computing device such as a mobile phone. Alternatively, the verification device may be a specialized device such as a hardware scanner configured for item verification.

A first unique identifier for the item is identified at 104 based on sensor data captured from the item label. According to various embodiments, the first identifier for the item may be determined in any of various ways. For example, the item label may include a barcode, QR code, Bluetooth beacon, RFID tag, or other such indicator of an item's identity. Accordingly, the verification device may collect the sensor data via a Bluetooth reader, an RFID reader, a camera, or any other suitable sensor device.

The first unique identifier value is authenticated to a remote database system at 106 to identify a corresponding data record in the remote database system. Additional details regarding techniques for item verification and authentication are discussed throughout the application, for instance with respect to the method 400 shown in FIG. 4.

A determination is made at 108 as to whether the item is authenticated via the first unique identifier value. In some embodiments, the determination may be made based on a response message received from the remote database system, as discussed with respect to the method 400 shown in FIG. 4.

Upon determining that the item is authenticated via the first unique identifier value, a second unique identifier value for the item is identified at 110 based on sensor data captured from the item label. In some embodiments, the second unique identifier value for the item may be identified in a manner similar to that employed for the first unique identifier at 104. Alternatively, a different technique may be used for identifying the second unique identifier value. For instance, the two different identifier values may be associated with different applications and/or different encoding techniques.

A determination is made at 112 as to whether the second unique identifier value is linked with the corresponding data record in the remote database system. According to various embodiments, the determination may be made in any of various ways. For example, the second unique identifier value may be used to access one or more records in the remote database system. The database system may then determine whether a record associated with the first unique identifier is the same as a record associated with the second unique identifier. As another example, the first unique identifier may be used to access one or more database records, which may include a reference database record value. This reference database record value may then be compared to the second unique identifier value to determine whether the two values match.

Upon determining that the second identifier is not linked with the corresponding data record, then the item is identified at 114 as being not verified. Upon determining instead that the second identifier is linked with the corresponding data record, then the item is identified at 116 as being verified.

In some embodiments, determining that an item is verified and/or not verified may involve performing one or more of various actions. For example, a response message may be sent from a database system to a client machine indicating the status of the item. As another example, one or more records may be stored in the database system reflecting the determination. The one or more records may include information such as a time and date that a verification request was received, an indication as to the information included in the request, and the verification status of the item.

Figure 2:
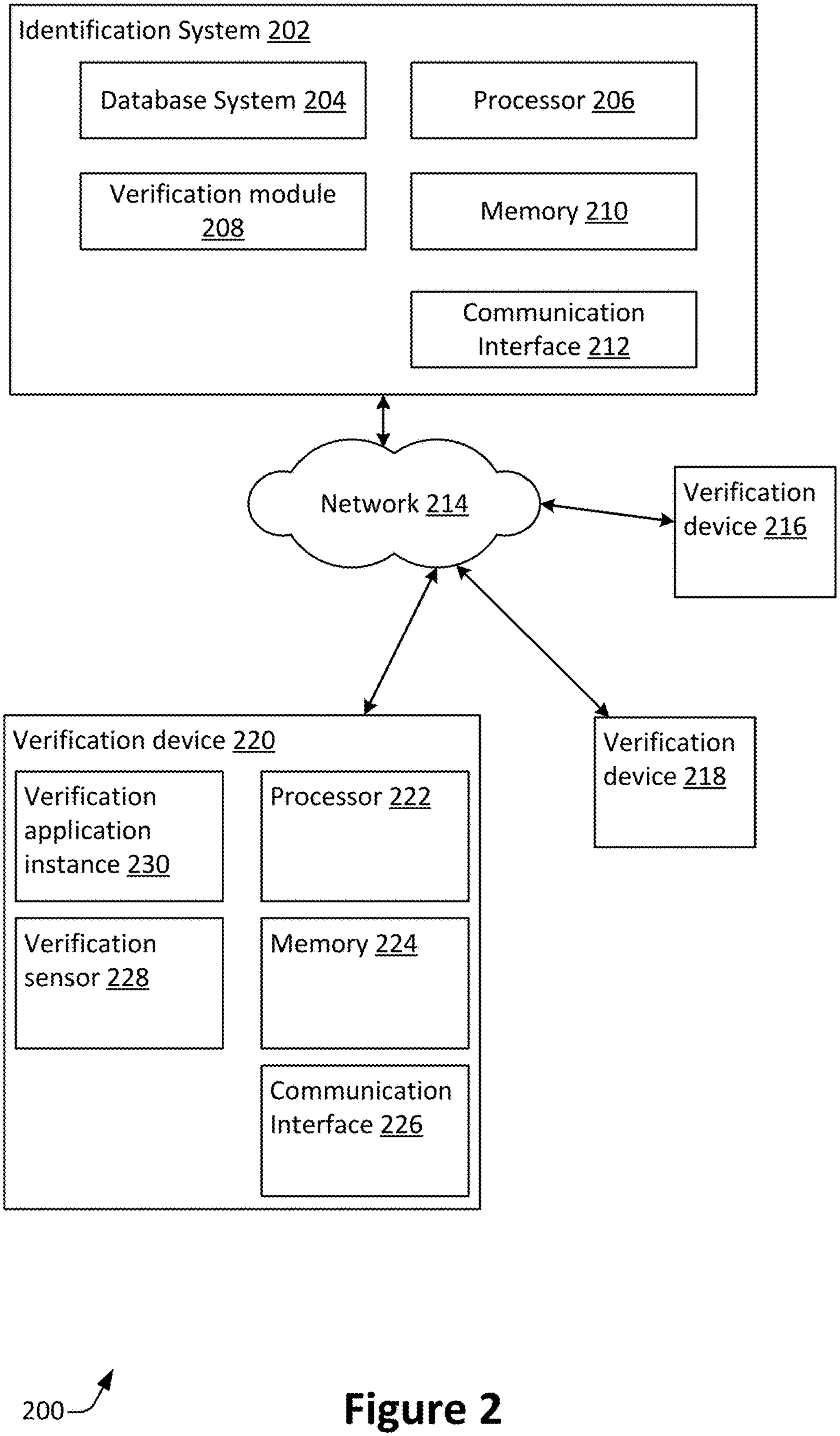
FIG. 2 illustrates an item identification and provenance verification system, configured in accordance with one or more embodiments.

FIG. 2 illustrates an item identification and provenance verification system 200, configured in accordance with one or more embodiments. According to various embodiments, the item identification and provenance verification system 200 may be used to perform various operations described herein related to item authentication and provenance verification.

The item identification and provenance verification system 200 includes an identification system 202 in communication via the network 214 with verification devices 216, 218, and 220. The identification system 202 includes a database system 204, a processor 206, a verification module 208, a memory module 210, and a communication interface 212. Each verification device includes a processor 222, a memory module 224, a communication interface 226, a verification sensor 228, and a verification application instance 230. Additional details regarding processors, memory, and communication interfaces are discussed elsewhere in the application, for instance with respect to FIG. 3.

According to various embodiments, the database system 204 is configured to store information associated with unique identifiers for items. For example, the database system 204 may include one or more database entries that link an item identifier with other information about an item, such as provenance information, physical characteristic information, and/or information collected based on sensor data determined from scanning the item. As another example, the database system 204 may include one or more database entries that identify history information associated with an item, such as locations, scanning data, possession transfers, ownership transfers, trading, other types of transfers, and other such information collected at various points in time. As discussed herein, a party that owns or possesses an item may be identified in the system in an anonymized fashion, for instance via a unique party identifier that is not linked to any identifying information. In some embodiments, information associated with unique identifiers for items may be stored in a distributed ledger such as a blockchain instead of, or in addition to, a database system.

In some embodiments, some or all of the information stored in the database system may be stored in a hashed and/or encrypted state. For example, a responsible party may be associated with a randomly generated party identifier rather than identifying information. In this way, the system may ensure privacy and support anonymized transfers of items between parties.

According to various embodiments, the verification module 208 is configured to perform various tasks related to the generation and maintenance of the information stored in the database system 204. For example, the verification module may be configured to generate item identifiers, facilitate provenance verification, and interact with verification devices.

According to various embodiments, the verification device may be any device capable of being configured to perform client-side operations discussed herein. For example, the verification device may be a mobile phone, a dedicated handheld scanning device, or a dedicated stationary scanning device. As another example, the verification device may be a subsystem that includes separate physical devices working in coordination. For instance, the verification device may be a computer configured to communicate with one or more external sensors such as cameras, RFID readers, Bluetooth beacon readers, or other types of sensors.

According to various embodiments, each verification device may include or communicate with one or more verification sensors 228. In some configurations, different verification devices may include different types of verification sensors. Examples of types of verification sensors that may be included in a verification device include, but are not limited to: cameras, depth sensors, LiDAR arrays, vibration sensors, accelerometers, light meters, fingerprint readers, gas sensors, spectroradiometers, accelerometers, Bluetooth communication interfaces, RFID readers, WiFi communication interfaces, GPS sensors, other types of location sensors, and/or combinations thereof.

According to various embodiments, each verification device may include a verification application instance 230. The verification application instance 230 may be configured to coordinate verification-related operations at the verification device 220, for instance by collecting sensor data via the one or more verification sensors 220 and communicating with the identification system 202 via the communication interface 226.

In some embodiments, the verification application instance 230 may be a native application implemented on a mobile computing device. Alternatively, the verification application instance 230 may be a progressive web application implemented in a web browser. In such a configuration, a mobile computing device such as a smart phone may be capable of validating the item label even in the absence of a dedicated application.

In some implementations, the network 214 may include the internet. Alternatively, or additionally, the network 214 may include one or more other networking elements such as one or more private networks.

According to various embodiments, an item identification and provenance verification system 200 may include different numbers of devices and components than shown in FIG. 2. For example, a device may include various numbers of processors, memory modules, and/or communication interfaces.

Additional details regarding item authentication and provenance verification, which may be used in conjunction with techniques and mechanisms described herein, are discussed in U.S. patent application Ser. No. 18/155,226, filed Jan. 17, 2023 by Robbers and Milito, titled "BULLION PRODUCT AUTHENTICATION AND PROVENANCE VERIFICATION SYSTEM", and in U.S. patent application Ser. No. 18/155,219, filed Jan. 17, 2023 by Robbers and Milito, titled "BULLION PRODUCT AUTHENTICATION AND PROVENANCE VERIFICATION SYSTEM, both of which are incorporated herein by reference in their entirety and for all purposes.

Figure 3:
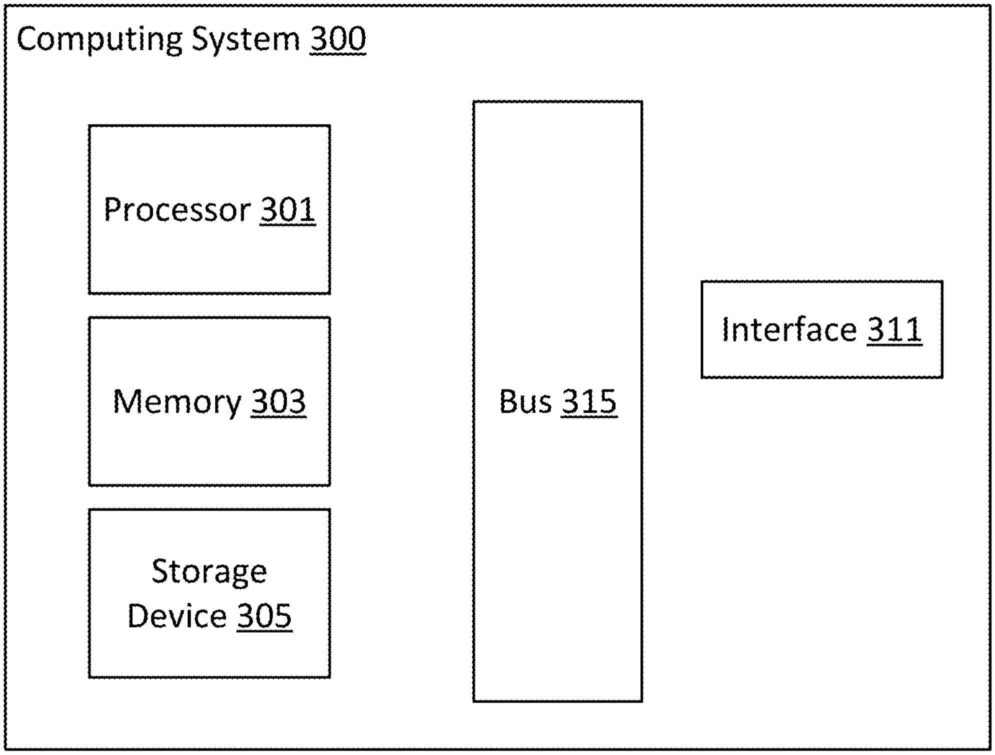
FIG. 3 illustrates one example of a computing system configured in accordance with one or more embodiments.

FIG. 3 illustrates one example of a computing system 300 configured in accordance with one or more embodiments. According to various embodiments, a computing system 300 suitable for implementing embodiments described herein includes a processor 301, a memory module 303, a storage device 305, an interface 311, and a bus 315 (e.g., a PCI bus or other interconnection fabric.) Computing system 300 may operate as a variety of devices such as an item identification device, a remote server, or any other device or service described herein. Although a particular configuration is described, a variety of alternative configurations are possible. The processor 301 may perform operations such as those described herein. Instructions for performing such operations may be embodied in the memory 303, on one or more non-transitory computer readable media, or on some other storage device. Various specially configured devices can also be used in place of or in addition to the processor 301. The interface 311 may be configured to send and receive data packets over a network. Examples of supported interfaces include, but are not limited to: Ethernet, fast Ethernet, Gigabit Ethernet, frame relay, cable, digital subscriber line (DSL), WiFi, mobile (e.g., LTE/5G), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 4:
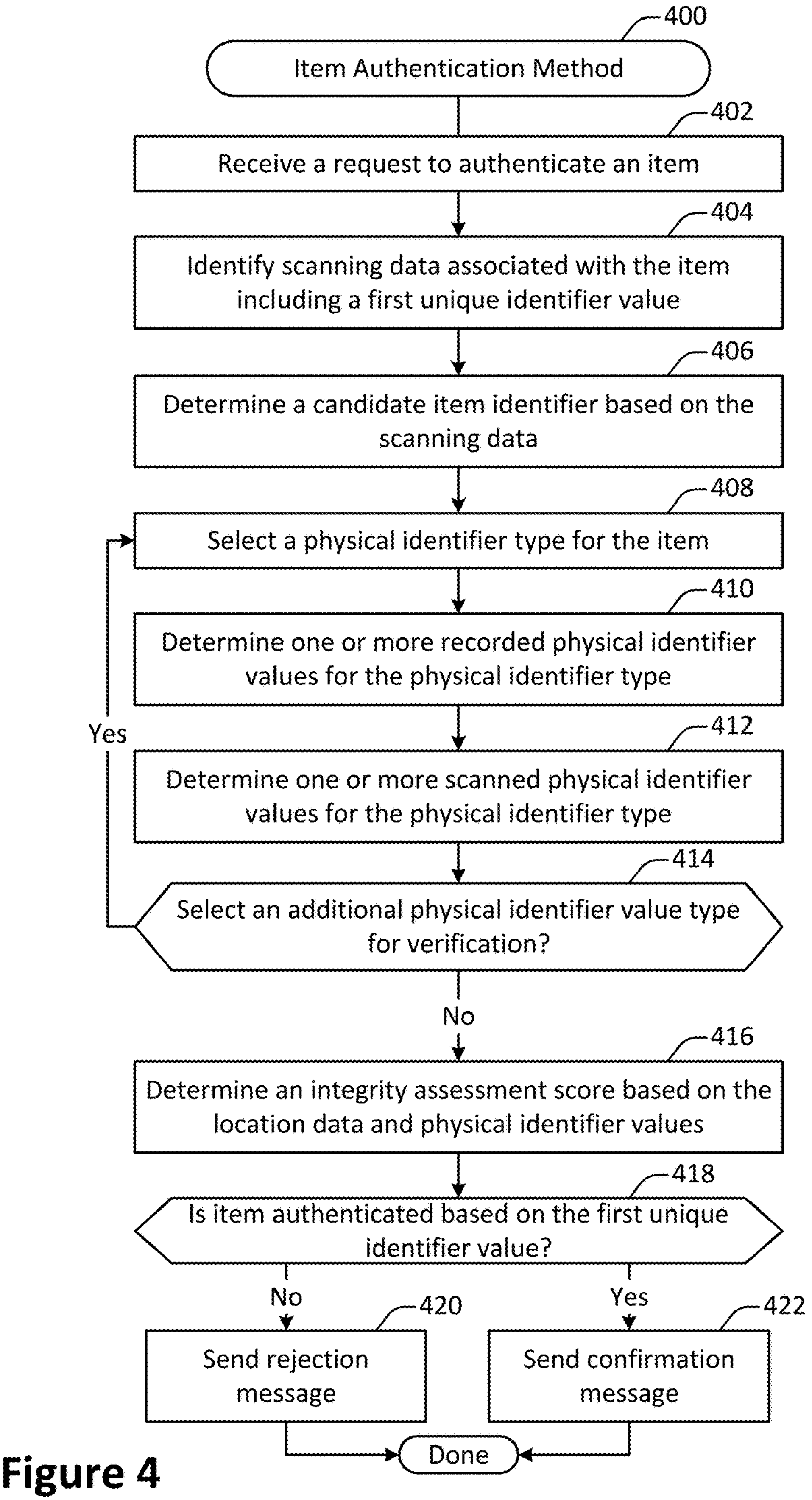
FIG. 4 illustrates a method for item authentication, performed in accordance with one or more embodiments.

FIG. 4 illustrates a method 400 for item authentication, performed in accordance with one or more embodiments. In some embodiments, the method 400 may be performed at any suitable computing device, such as one or more devices in the system 200 shown in FIG. 2.

A request to authenticate an item is received at 402. In some embodiments, the request may be generated automatically when the item is scanned via a verification application instance 230 interacting with one or more verification sensors 228 at the verification device 220. Alternatively, a request may be generated before or after such a scan is performed.

Scanning data associated with the item is identified at 404. According to various embodiments, the scanning data may include any data capable of being scanned via the one or more verification sensors 228. For instance, the scanning data may include image data, video data, depth sensor data, LiDAR data, light sensor data, location data, or any other data captured by the verification device 220 or other devices or sensors in direct or indirect communication with the identification system. The scanning data may be processed or preprocessed at the verification device 220, and then transmitted to the identification system 202.

A candidate item identifier is determined at 406 based on the scanning data. In some embodiments, the candidate item identifier may be determined by decoding the scanning data. For example, the scanning data may include visual data of a barcode, QR code, text-based item identification number, or other such encoding of the item identification number. As another example, the scanning data may include Bluetooth beacon data received from a Bluetooth beacon physically coupled with the item. As yet another example, the scanning data may include RFID data captured by reading an RFID tag coupled with the item via an RFID sensor. As still another example, the scanning data may include one or more data sources that may be combined to yield the candidate item identifier. For instance, data from a QR code may be combined with data from Bluetooth beacon device and/or RFID tag to yield an item identifier.

A physical identifier type for the item is selected at 408. As discussed with respect to the method 400 shown in FIG. 4, one or more of a variety of physical identifiers may be used in combination to provide additional security. Accordingly, any of various types of physical identifiers may be selected at 408. Physical identifiers may include any attributes of an item, such as a location at which the item is scanned, an account associated with the scanning of the item, and/or identification mechanism coupled with or embedded in the item.

In some embodiments, the selection of the physical identifier type at 408 may be limited based on the type or types of physical identifiers associated with the item. For instance, the verification module 208 may access the database system 204 to determine which types of physical identifiers are associated with the item linked with the candidate item identifier determined at 406.

In some embodiments, the selection of the physical identifier type at 408 may be limited based on the availability of scanning data. For instance, in some situations the verification device 220 may be unable to verify one or more of the physical identifier types. For example, the item may be associated with micro-percussion QR code depth data, which the verification device 220 may be unable to read if the verification device 220 lacks a depth sensor. In such a situation, the unavailable physical identifier type may be skipped. However, skipping the unavailable physical identifier type may impact the integrity assessment score ultimately determined for the item.

A determination is made at 410 as to one or more recorded physical identifier values for the physical identifier type. In some implementations, the one or more recorded physical identifier values may be determined by accessing the database system 204. For instance, the database system may include one or more records associating the candidate item identifier with various types of information that may be determined based on scanning data received after scanning the item.

A determination is made at 412 as to one or more scanned physical identifier values for the physical identifier type. In some implementations, the determination made at 412 may be made by processing the scanning data identified at 404 based on the physical identifier type selected at 408.

According to various embodiments, any of a variety of physical identifier values may be determined at 410. The specific values that are determined may depend on the type of physical identifier selected at 408. For example, in the case of location data, the recorded and scanned physical identifier values may include anticipated and scanned location data for the item. As another example, in the case of a QR code or other encoded format, the recorded and scanned physical identifier values may include anticipated and scanned decoded code values.

In some embodiments, location data may be treated as a physical identifier type. For instance, a current location may be compared with an anticipated location. In some situations, an anticipated location may be a specific region. A region may be specified as one or more edges, as a radius around a set of latitude and longitude coordinates, or in some other way. Alternatively, or additionally, to accommodate the transport of items an anticipated location may be specified as a route, such as a route between or among two or more points. As with a region, a route may be specified with some degree of fuzziness, such as a zone around a specified route.

A determination is made at 414 as to whether to select an additional physical identifier value type for verification. According to various embodiments, additional physical identifier value types may continue to be selected until all available physical identifier value types have been checked. Alternatively, checking may terminate at some point, for instance after a designated number of physical identifier value types have been checked and found to match.

In some embodiments, two or more physical identifier value types may be checked in sequence. Alternatively, or additionally, two or more physical identifier value types may be checked in parallel.

An integrity assessment score is optionally determined at 416 based on recorded and scanned physical identifier values. Additional details regarding the determination of the integrity assessment score are discussed with respect to the method 600 shown in FIG. 6.

A determination is made at 418 as to whether the item is authenticated based on the first unique identifier value. In some embodiments, making the determination may involve determining whether the unique identifier value was located in the database at operation 406. Optionally, one or more physical identifiers may be evaluated as discussed at 408 through 414 to further confirm that the first unique identifier value is associated with the correct item.

Upon determining that the item is authenticated, then at 422 a confirmation message is sent to the client machine. Upon determining instead that the item is not authenticated, then at 420 a rejection message is sent to the client machine instead. Additionally, one or more database records may be stored in the database system reflecting the failed or successful authentication attempt.

Figure 5:
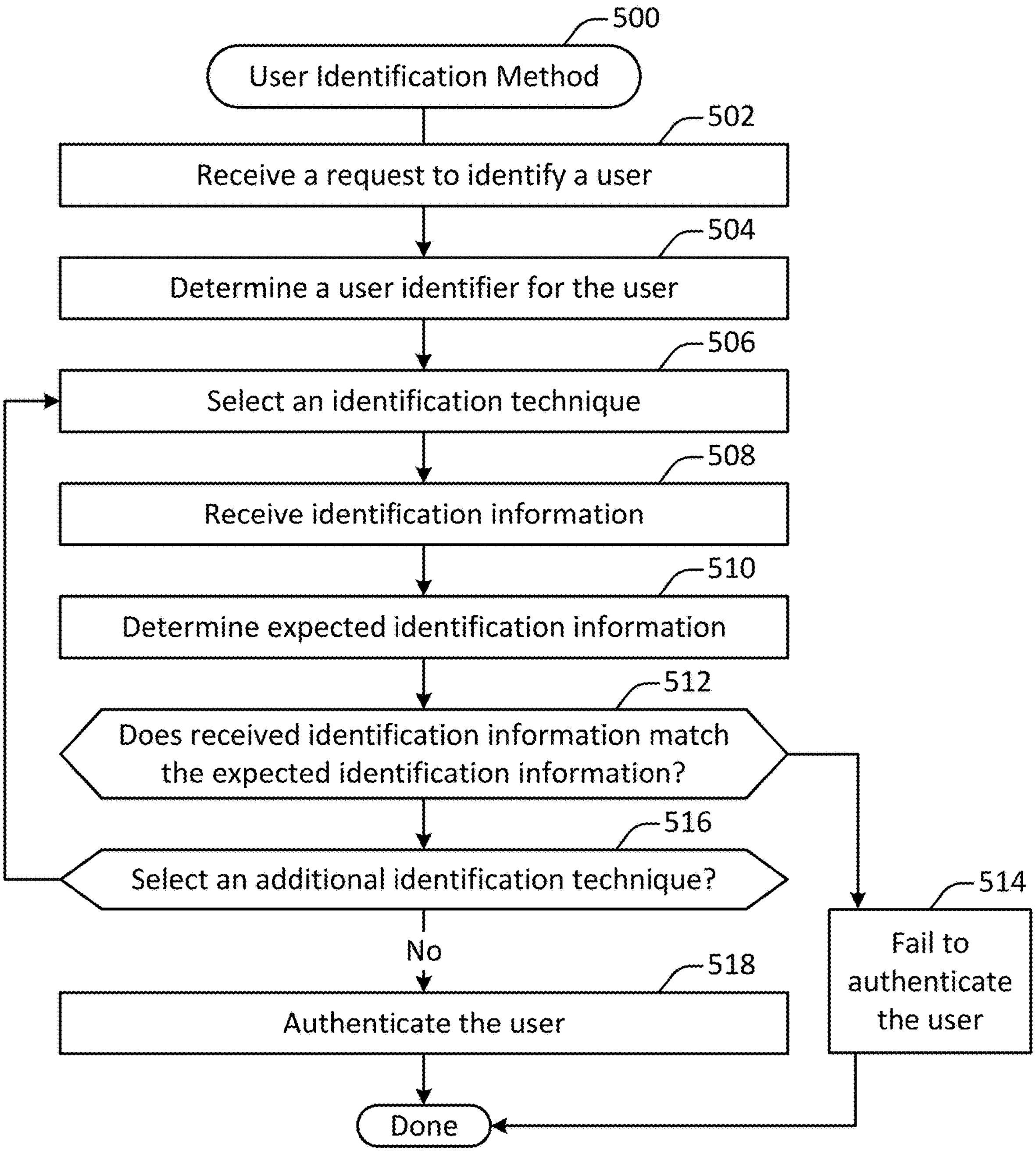
FIG. 5 illustrates a method for identifying a user, performed in accordance with one or more embodiments.

FIG. 5 illustrates a method 500 for identifying a user, performed in accordance with one or more embodiments. The method 500 may be performed at any suitable computing device. For instance, the method 500 may be performed at a client machine, a server, or a client machine in communication with a server.

A request to identify a user is received at 502. In some embodiments, the request may be generated at a client machine and may be transmitted to a remote computing device such as a server configured to provide authentication services. The request may be received at any of various times, for instance as part of the item authentication method 400 shown in FIG. 4.

In particular embodiments, different types of users may be associated with different types or levels of identification. For example, a user associated with the enrollment of items may be personally identified to the system. As another example, a user associated with the authentication, identification, and/or verification of items may be identified in a more limited fashion. For instance, such a user may be linked to a unique anonymous identifier in the system, and may also be linked to a specific location at which the item authentication, identification, and/or verification occurs. As yet another example, additional verification checks may be imposed for some or all user accounts under one or more conditions. For instance, authentication may be subject to two-factor authentication, with a response required within a set and limited timeframe.

A user identifier for the user is determined at 504. According to various embodiments, the user identifier may be any identifier unique to the user. For example, the user identifier may be a randomly generated number, an email address, a username, or any other suitable identifier. In some configurations, the user identifier may be manually provided by the user or the user's device, for instance via a user input device. Alternatively, the user identifier may be determined automatically, for instance after collecting data from scanning a user's face, recording a user's voiceprint, or capturing a user's fingerprint.

An identification technique is selected at 506. According to various embodiments, any of a variety of identification techniques may be used to authenticate the user. In some embodiments, user knowledge may be used to authenticate the user. Examples of user knowledge may include, but are not limited to: passwords, passkeys, personal identification numbers (PINs), challenge questions, personally identifying information such as a social security number or birthdate. For example, a user may be asked a randomly selected challenge question previously answered by the user, for instance during an enrollment process. As another example, a user may be asked to provide a password created by the user. As yet another example, a user may be asked to provide a passkey, for instance a unique passkey generated automatically and cryptographically by the system. The passkey may be, for instance, the private key portion of a public-private key pair, with the public key portion held by the system.

In some embodiments, user biometric data may be used to authenticate the user. Examples of user biometric data may include, but are not limited to: photographic data, fingerprint data, retinal scan data, and voice print data. For instance, the user may be asked to take a photo of the user's face, provide a fingerprint scan, or speak a phrase.

In some embodiments, possession of an object or information may be used to authenticate the user. For example, the user may be asked to provide a code generated by a two-factor authentication app, a code received via a text message, or a code generated by a physical security device. As another example, the user may be asked to respond to a request for location sent to the user's mobile computing device in response to receiving from the mobile computing device a request to enroll, identify, authenticate, and/or verify an item.

Identification information is received at 508. According to various embodiments, the techniques involved in receiving the identification information may depend on the identification technique. For example, biometric data may be determined by collecting sensor data at the client device. As another example, information such as a password or code may be determined based on user input provided at a client device. As yet another example, some data may be collected from systems or devices independent of the client device and the server, such as via a security camera system or fingerprint scanner in independent communication with the remote server.

Expected identification information is determined at 510. In some implementations, the expected identification information may be determined by accessing a database at the remote server. For instance, the user identifier may be linked with identification information stored in a secure database. In some configurations, personally identifying or biometric information may be hashed, encrypted, or otherwise concealed after it is collected, to provide for privacy and security. For example, some or all of the identifying information may be stored in a hashed or encrypted format in which it is completely and irreversibly obscured.

A determination is made at 512 as to whether the received identification information matches the expected identification information. The nature of the determination made at 512 may depend at least in part on the selected identification technique. For example, an entered password may need to exactly match an expected password, while collected fingerprint data may only need to be similar to expected fingerprint data.

In particular embodiments, additional information such as location data may be collected and verified to provide for additional security. For example, when a request to identify a user is received at 502, the request may be generated at a native application on a mobile computing device that is capable of determining location information for the mobile computing device, for instance via global positioning system (GPS) data. Such information may then be provided to the remote server responsible for authenticating the user. Then, when receiving identification information at 508, the location information may be collected again. For instance, the identification information may need to be provided via a web interface at a link sent via text message. In this case, the determination made at 512 may involve determining whether the two locations are the same in addition to the received and expected identification information. A discrepancy between the two locations may indicate that a user not present at a physical location is attempting to assist another individual at the physical location to authenticate as the user.

If the received identification does not match the expected identification information, then the user authentication fails at 514. In some embodiments, the user may be able to provide additional information to attempt authentication again. For instance, a failed password attempt may be met by another opportunity to provide the correct password. However, user authentication failure may also trigger additional actions, such as temporarily or permanently freezing the user identifier determined at 504 from being authenticated in the future.

In particular embodiments, when a user fails to authenticate, one or more failure messages may be sent, and/or information may be saved in the database system. For instance, a failure message may be sent to a foundry or other entity associated with the user, a systems administrator, and/or an authentication device associated with the user.

If instead it is determined that the received identification information matches the expected identification information, then at 516 a determination is made as to whether to select an additional identification technique. According to various embodiments, identification techniques may be selected and applied in sequence, in parallel, or in any suitable order.

In some embodiments, a specific set of one or more identification techniques may be applied to each user. Alternatively, or additionally, one or more identification techniques may be selected at random or according to some pattern. For example, a user may be asked to provide one of several types of biometric information. As another example, a user may be asked to provide one or more of various types of information known to the user, such as the answers to one or more of a set of challenge questions. In particular embodiments, insufficient or indeterminate responses to identification queries may trigger the application of additional verification techniques. For instance, if a user's fingerprint scan is indeterminate, then one or more additional identification techniques may be selected.

If it is determined not to select an additional identification technique, then at 518 the user is authenticated. According to various embodiments, authenticating the user may allow the user to perform additional tasks, such as authenticating an item. Alternatively, authenticating the user may affect the performance of item authentication, for instance by increasing an integrity score.

Figure 6:
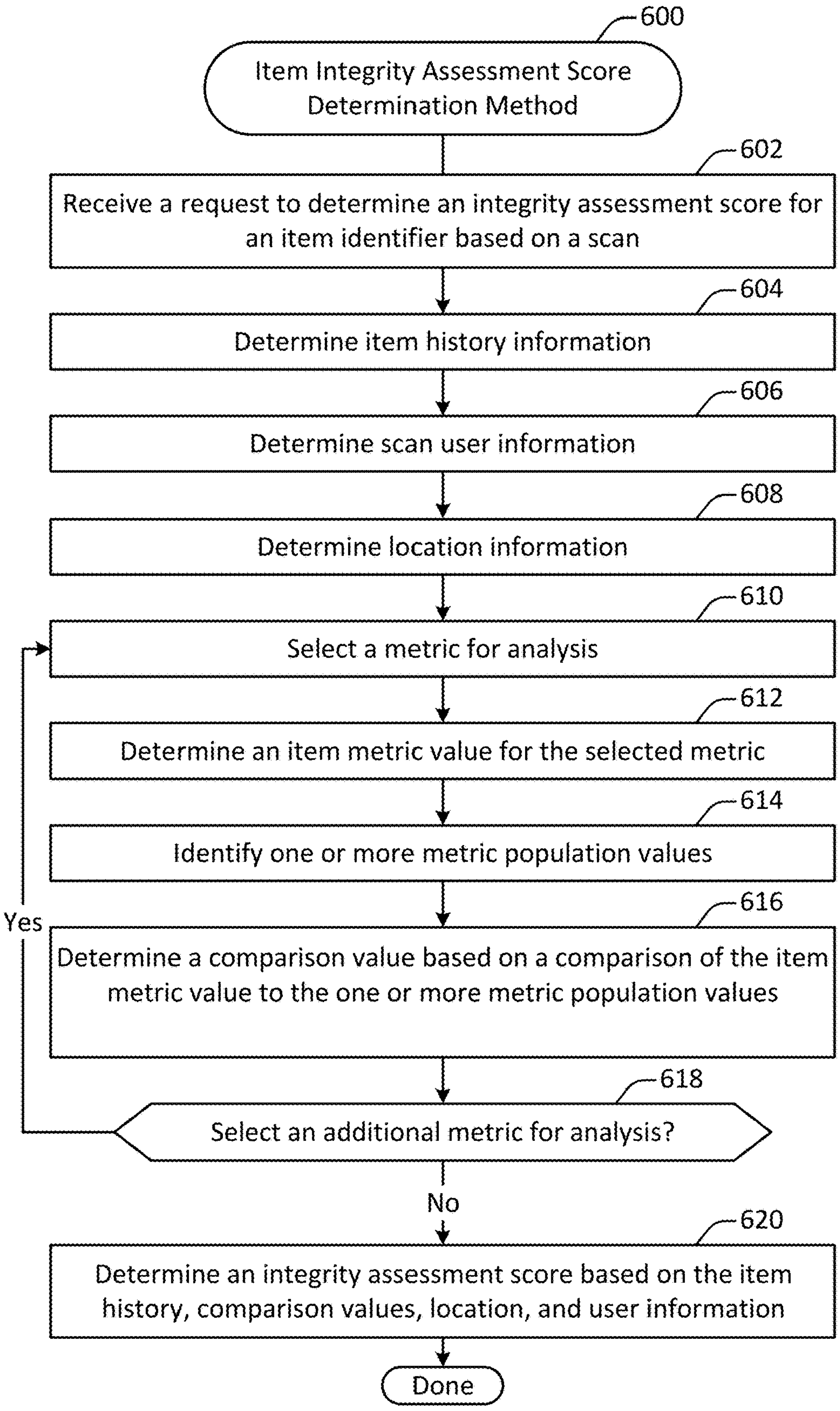
FIG. 6 illustrates a method for determining an integrity assessment score for an item, performed in accordance with one or more embodiments.

FIG. 6 illustrates a method 600 for determining an integrity assessment score for an item, performed in accordance with one or more embodiments. According to various embodiments, the method 600 may be performed at any suitable computing device, such as for example one or more of the devices or systems shown in FIG. 2.

A request is received at 602 to determine an integrity assessment score for an item identifier based on a scan. According to various embodiments, the request may be generated as discussed with respect to the operation 416 shown in FIG. 4.

Item history information is determined at 604. In some embodiments, the item history information may include any information about the original provenance and subsequent history of the item. History information may include, but is not limited to, information about ownership changes, location changes, prior authentication operations, prior authentication issue correction operations, and the like.

Scan user information is determined at 606. In some embodiments, the scan user information may indicate whether the scan of the item leading to the determination of the integrity assessment score was performed by an authenticated user. In the event that a user was authenticated, information about the user may include the user's history within the system, the user's biographic information, and other scans performed by the user. For instance, information may be collected about the locations, integrity assessment scores, and/or authentication scores associated with the user's prior scans of other items.

Location information is determined at 608. According to various embodiments, the term "location information" as used herein may refer to various types of data determined in any of various ways, depending on factors such as hardware and software availability and system configuration. For example, location information may include GPS information received from the mobile computing device providing the scan information. As another example, location information may include data received from cell towers from which a mobile computing device is connecting to the network. As yet another example, location information may include WiFi SSID data, IP address data, or other such indicators of location.

A metric is selected for analysis at 610. According to various embodiments, any of a variety of metrics may be analyzed to determine the integrity assessment score. Examples of such metrics may include, but are not limited to: a number of previous scans, information about a batch of items in which the focal item is included, information about ownership changes associated with the item, information about location changes associated with the item, information about prior authentication issues associated with the item, information about correction of prior authentication issues associated with the item, and the like.

An item metric value is determined for the selected metric at 612. In some embodiments, the item metric value may be determined based on information stored in the database system 204 shown in FIG. 2. For instance, information about changes to location, possession, trading, anonymized ownership, past authentication, item batch, and the like may be retrieved from the database system.

One or more metric population values is identified at 614. According to various embodiments, a metric population value may include or be calculated as a mean, median, quantile, standard deviation, or other statistic determined based on the metric as determined for other items. For instance, a number of past ownership or responsible party changes for the item may be compared with the number of past ownership or responsible party changes for the population of similar items.

In particular embodiments, a metric population value may be limited to a population of items comparable to the focal item on one or more dimensions. For instance, an item may be compared with other items of similar size, purity, weight, composition, age, provenance, and/or history. Alternatively, or additionally, a metric population value may be determined based on a weighting scheme, for instance so that metric values from more comparable items are more highly weighted when determining the one or more metric population values.

A comparison value is determined at 616 based on a comparison of the item metric value to the one or more metric population values. In some embodiments, the comparison value may be determined based on statistical analysis. For example, a Z-score may be computed by first subtracting the item metric value determined at 612 from a population mean determined at operation 614, and dividing the result by a population standard deviation determined at operation 614. As another example, an item metric value may be standardized on a range (e.g., zero to one) based on the metric population values identified at 614. As yet another example, an item metric value may be compared with a designated threshold such as a quantile (e.g., the $65^{th}$ percentile) identified at operation 614 based on the population values.

A determination is made at 618 as to whether to select an additional metric for analysis. According to various embodiments, additional metrics may continue to be selected so long as additional metrics are available for analysis. Metrics may be analyzed in serial or in parallel.

An integrity assessment score is determined at 620 based on the comparison values, the item history, the location information, and the scan user information. According to various embodiments, determining the composite score may involve determining a weighted average of the comparison values determined at 616. Alternatively, or additionally, a different combination process may be used. For instance, the minimum of the comparison values may be used to determine the composite score.

In particular embodiments, a user account may be associated with an account integrity score. For instance, a user that is known to the system and that has a lengthy and positive history may have a relatively higher account integrity score. Then, a scan by a user with a higher integrity score may in turn lead to a higher integrity score for the scanned item.

In some embodiments, information related to the item history information and/or the scan user information determined at operation 604 and/or 606 may be used to further weight or otherwise shape the integrity assessment score.

In particular embodiments, the integrity assessment score 618 may be determined directly from the item metric values, for instance via a machine learning model trained based on metric population values, scan user information, and/or item history information. For example, an outlier detection algorithm may be applied such as an elliptic envelop algorithm, an isolation forest algorithm, a one-class SVM algorithm, or a local outlier factor (LOF) algorithm.

In particular embodiments, the integrity assessment score 618 may be determined at least in part by applying one or more predetermined rules or thresholds. For instance, an integrity assessment score may be limited to a designated value when a bar has failed authentication at least once, even if the authentication issue was subsequently corrected.

Figure 7:
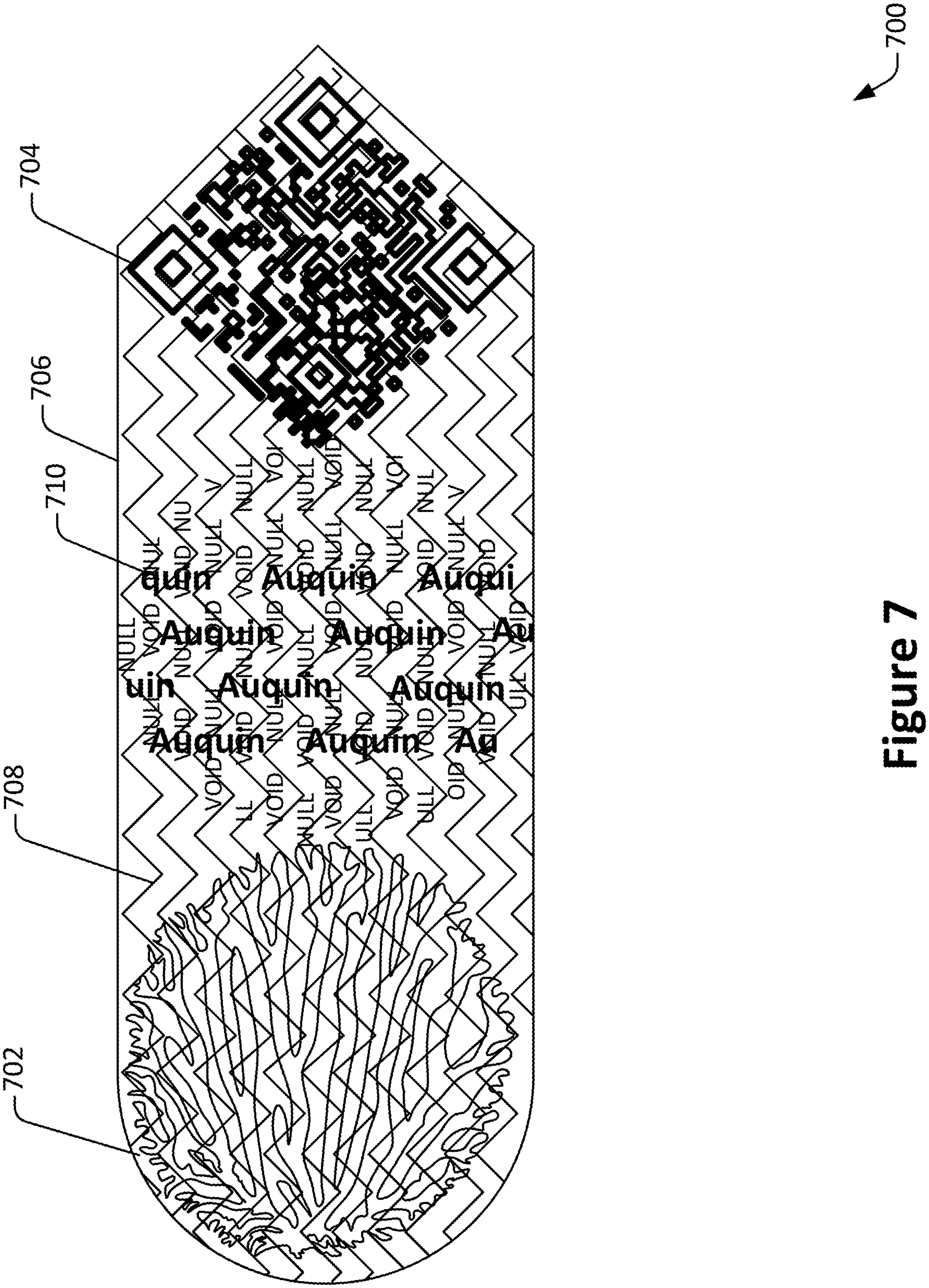
FIG. 7 illustrates an item authentication label, generated in accordance with one or more embodiments.

FIG. 7 illustrates an item authentication label 700. According to various embodiments, the item authentication label 700 may be affixed to an item, either directly or indirectly, to facilitate the identification of the item, the authentication of the item, and the verification of the item's provenance.

According to various embodiments, the item authentication label 700 includes a fingerprint item identifier 702 and a digital identifier 704 disposed on a label substrate 706. The label substrate 706 may be equipped with one or more breakaway portions 708. One or more text messages 710 may also be printed on the label.

According to various embodiments, the fingerprint item identifier 702 may include any visual representation that is sufficiently unique and sufficiently difficult to reproduce. For example, the fingerprint identifier 702 may be a dendritic structure. Additional details regarding dendritic structures are discussed in U.S. Pat. Nos. 9,773,141 and 10,074,000, both of which are hereby incorporated by reference in their entirety and for all purposes.

According to various embodiments, the fingerprint item identifier 702 may be a stochastically produced visual pattern. For example, the fingerprint item identifier 702 may include one or more of a dendritic structure, a microdot, a micromirror array, a pattern printed in optical ink with suspended metallic flakes, suspended crystals, a microtexture, a microstructure, a pattern printed using one or more specialized dyes that reveal a stochastically created pattern, a stochastically created QR code pattern, or the like. Thus, the dendritic structure is only an example of the type of identifier that may be used.

In some embodiments, a stochastically produced visual pattern may be created at least in part through a random process, and may reflect two distinct characteristics. First, such a visual pattern may be used to determine a unique identifier when scanned via a high resolution camera or other sensor. Second, reproducing a stochastically produced visual pattern with a sufficiently high degree of accuracy such that the reproduction is indistinguishable from the original may be difficult to the point of being effectively impossible, given the random nature of the creation process. For example, a dendritic structure may include branching microstructures that are visible and distinguishable at a very high level of detail using a high-resolution camera, which have a scanning resolution that exceeds the resolution of a printer. In such a configuration, a printer could not reproduce the dendritic structure with sufficiently high fidelity that a high-resolution camera could not be used to distinguish between the original dendritic structure and the printed replacement. As another example, crystals and/or metallic flakes may be randomly distributed in optical ink in such a way that reproducing the exact configuration of crystal and/or metallic flake distribution would be effectively impossible.

In some embodiments, the digital identifier 704 may include any element used to uniquely identify an item. For example, the digital identifier 704 may include a barcode, QR code, Bluetooth beacon, RFID tag, or other such indicator of an item's identity. The digital identifier 704 may be used to access one or more records in a remote computing system storing information about the item.

According to various embodiments, the digital identifier 704 and the fingerprint item identifier 702 may be positioned on a label substrate 706. The label substrate 706 may be made of any suitable substance, such as a substance including one or more of glass, plastic, metal, paper, fabric, an electrical insulator, and a semiconductor. Depending on the configuration, the label substrate 706 may be either flexible or rigid.

In some embodiments, the label substrate 706 may be perforated with one or more breakaway portions 708. The breakaway portions 708 may include a plurality of cuts extending through at least a portion of the thickness of the substrate. In some configurations, at least some of the plurality of cuts extend entirely through the thickness of the substrate, and at least some of the plurality of cuts extend through at least a portion of a thickness of a protective layer located on top of the substrate.

In some embodiments, the breakaway portions may be configured such that once affixed to a surface, the item authentication label 700 may not be removed from the surface without destroying the integrity of some or all of the item authentication label 700. For instance, removing the item authentication label 700 from a surface to which it is affixed may destroy the integrity of the fingerprint item identifier 702, the digital identifier 704, or both.

In some implementations, the fingerprint authentication process relies on visual variations in the fingerprint that are too detailed to print with sufficient fidelity such that the printed reproduction would be authenticated as the original. Given the level of detail captured by such a process, the various adhesives and/or die cut lines mean that manually removing, moving, and replacing the item authentication level 700 would distort the fingerprint to such a degree that the authentication process would fail, even after careful reconstructive placement of the fingerprint.

In some embodiments, one or more printed text messages 710 may aid in facilitating visual verification of the integrity of the item authentication label 700. For instance, a printed text message may include words such as "NULL" and "VOID" in a pattern that would be disrupted by an attempt to remove the item authentication label 700 from a surface to which it was affixed.

Figure 8:
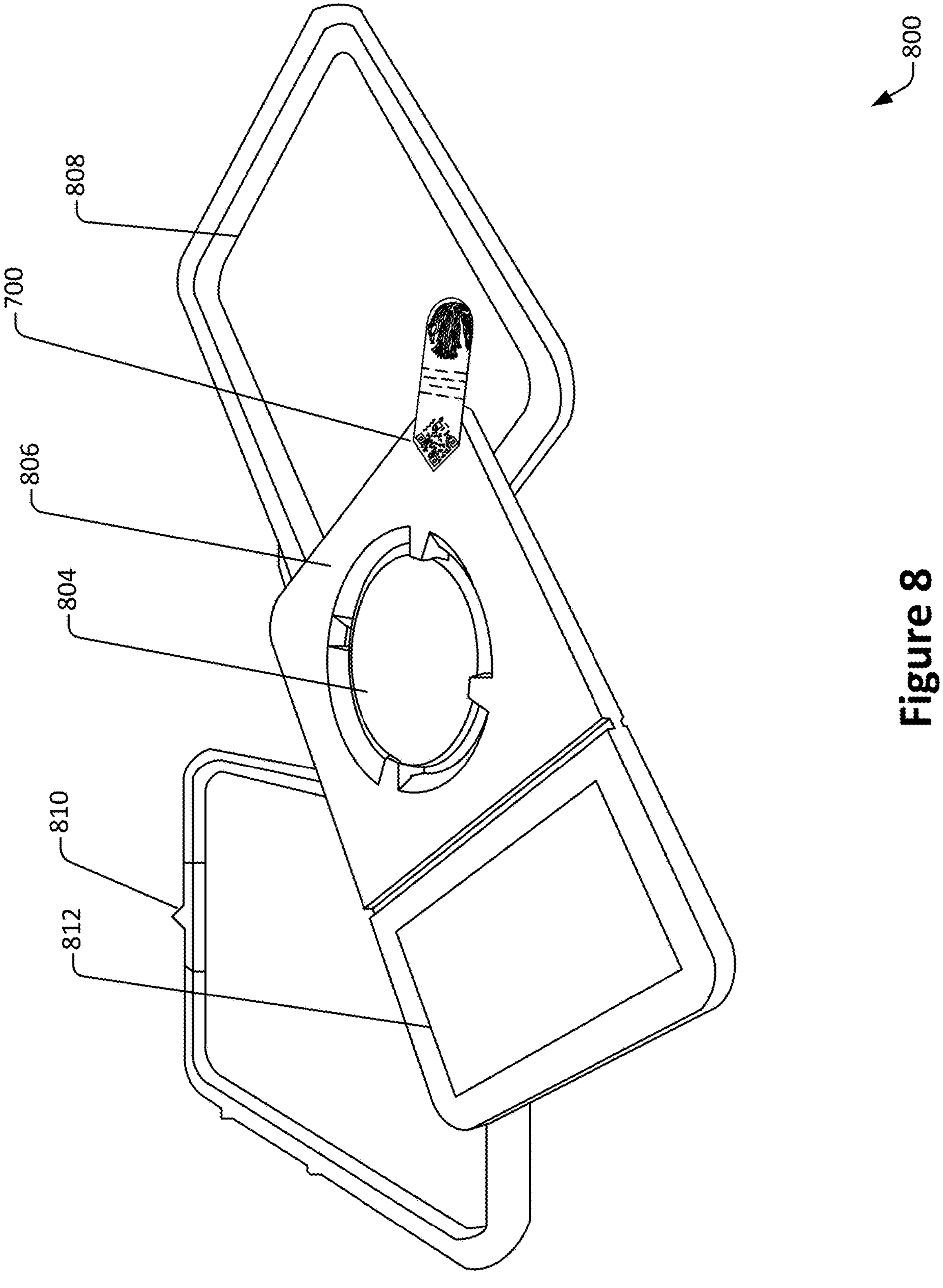
FIG. 8 illustrates an item package, configured in accordance with one or more embodiments.

FIG. 8 illustrates an item package 800, configured in accordance with one or more embodiments. The item package 800 includes an item 804, which is positioned in an item container 806. The item container 806 is then enclosed in an item case that includes a back case portion 808 and a front case portion 810.

According to various embodiments, the item package 800 may be used to secure the item 804. Various types of items may be secured for the purpose of authentication and provenance verification. Examples of such items may include, but are not limited to, coins, metal bullion, collectables, luxury goods, art, pharmaceutical containers, fluid containers (e.g., perfume, alcohol), medical supplies, and/or measuring devices (e.g., devices used in gas stations, devices used for weight and/or volume assessments, etc.)

In some embodiments, the item container 806 may be configured so as to securely hold the item 804. For instance, the item container 806 may include an opening sized to include the item 804. The item container may optionally include one or more other elements, such as an item description tag 812 that holds a written description of the item 804.

According to various embodiments, an item package 800 may be configured in a way that is specific to an item, an item type, and/or other context. For example, the particular example of an item package 800 shown in FIG. 8 may be referred to as a "coin holder", and the particular example of an item container 806 may be referred to as a "gasket." However, the item label may be used in conjunction with any of a variety of types of item packages that are configured to store one or more of various types of items. Thus, the coin holder shown in FIG. 8 is provided for the purpose of illustration, while techniques and mechanisms described herein are broadly applicable to a wide variety of items and item packages.

In some implementations, the item container 806 may be enclosed in a case which may include one or more elements such as the front case portion 810 and the back case portion 808. The case may be configured so as to securely close around the item container such at the item cannot be removed from the case without destroying the item identification label 700 such that it cannot be used to authenticate and verify the provenance of the item 804. For example, when applied to the item package 800 as shown in FIG. 8, the label 700 fuses together the item container 806, the front case portion 810, and the back case portion 806.

In some embodiments, as is discussed in more detail with respect to FIG. 5, the item authentication label 700 may be configured with one or more breakaway portions and/or adhesive portions that effectively prevent the removal of the case without rendering item authentication label 700 ineffective for item verification.

In some embodiments, as is shown in FIG. 8, the item authentication label 700 may be folded over different portions of the item container, such as a front portion and a back portion. Then, each of the front case portion 810 and the back case portion 808 may be affixed to the item authentication label 700 with adhesive in such a way that the integrity of the item authentication label 700 is destroyed when either the front case portion 810 or the back case portion 808 is removed.

FIG. 8 illustrates only one possible configuration of an item package 800 that includes an item 804 and an item authentication label 700. However, various configurations are possible in keeping with techniques and mechanisms described herein. For example, the item package 800 may omit an item container 806. In such a configuration, the item identification label 700 may be affixed directly to the item itself. Such a configuration may be used, for instance, for an item such as bullion. As another example, the item package 800 may be configured such that the item 804 is positioned directly in the back case portion 808. In such a configuration, the item authentication label 700 may be positioned flat between the item container 806 and the front case portion 810 rather than folded over.

Figure 9:
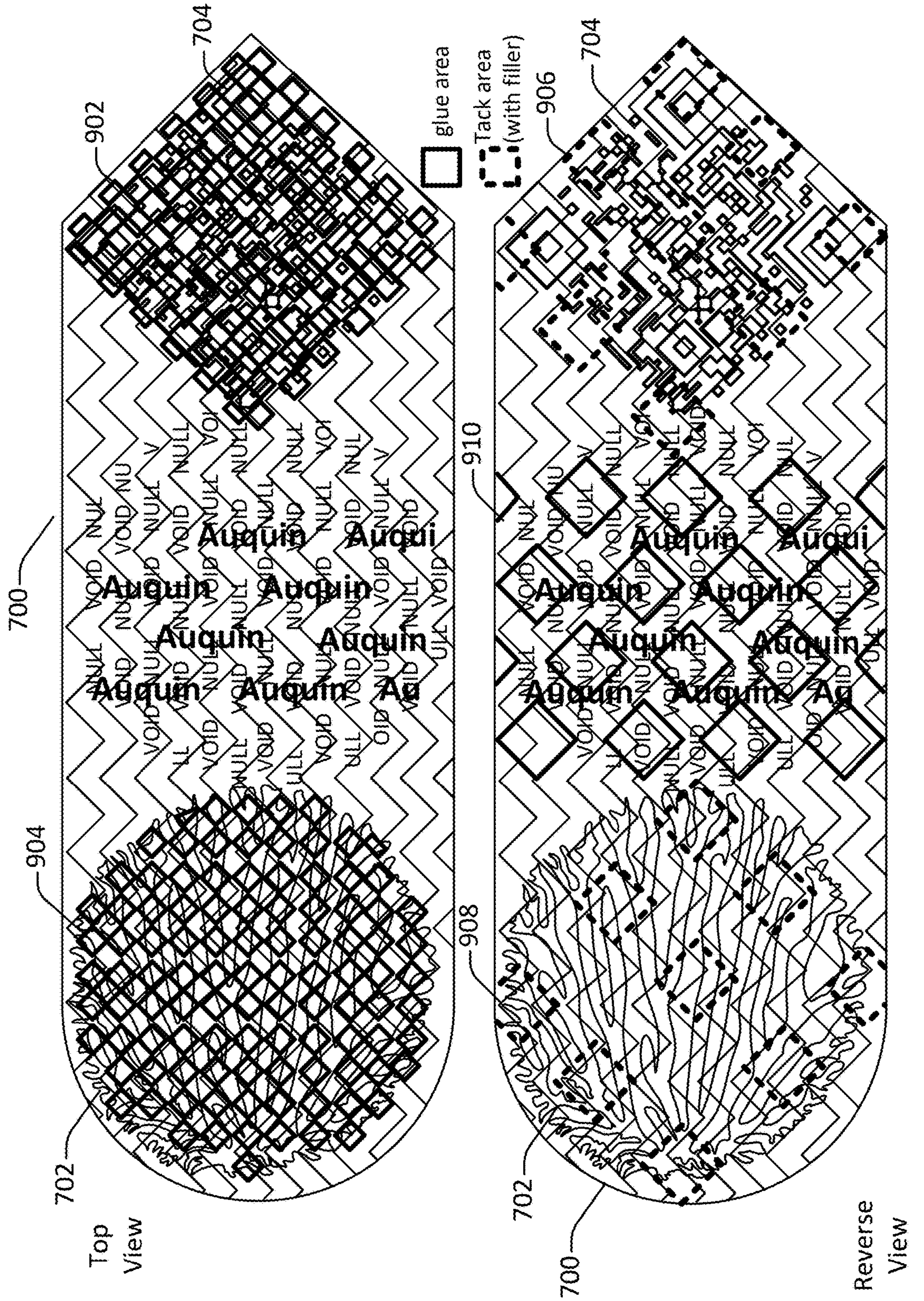
FIG. 9 illustrates a top (top) and reverse (bottom) view of the item authentication label.

FIG. 9 illustrates a top (top) and reverse (bottom) view of the item authentication label 700. In some embodiments, one or more adhesives may be applied to the top and/reverse side of the item authentication label 700. The adhesives may be used to affix the item authentication label 700 to a surface, such as an item container and/or a case enclosing an item container. Additional details regarding the configuration of an example of an item package that includes an item authentication label 700, and item container, and a case are discussed with respect to FIG. 9.

In some implementations, different kinds of adhesives may be employed for an item authentication label 700. For example, one type of adhesive that may be employed is glue. Glue may bond tightly to a surface such that removal of the item authentication label 700 from the surface may require destructive techniques such as scraping the authentication label from the surface or chemically dissolving the item authentication label 700 and/or the glue. As another example, another type of adhesive that may be employed is tack. Tack may provide adhesion of the item authentication label 700 to a surface but may nevertheless be more easily removable than glue. For instance, the item authentication label 700 may be peeled from the surface.

In some embodiments, filler may be employed in conjunction with one or more adhesive layers. Such a configuration may help to ensure that an adhesive layer makes firm contact with an external surface. Such as the case components 808 and 810 shown in FIG. 8. For instance, a tack layer may be placed on top of a filler layer to push the label 700 and in consequence to push the glue area away from the item container 806 and toward the case components 808 and/or 810.

In some embodiments, different types of adhesives may be employed in different regions of the item authentication label 700. For example, glue may be employed on the top surface of the item authentication label 700 so that the item authentication label 700 may be affixed permanently to a case that encloses an item. As another example, glue may be employed on the reverse surface of the item authentication label 700 to ensure destruction of the fingerprint item identifier 702 and the digital identifier 704 were the item authentication label 700 removed from a surface to which it was affixed.

In some embodiments, a cover layer may be removably attached to an adhesive layer. Such a cover layer may sometimes be referred to as a "backer film." The cover layer may be used to keep the adhesive layer intact and active until application. The cover layer may then be removed immediately prior to application. Different adhesive layers may be associated with different cover layers. For instance, a first cover layer may be removably attached to a first adhesive layer, and a second cover layer may be removably attached to a second adhesive layer.

In some embodiments, adhesives may be applied to the item authentication label 700 in one or more patterns. For example, in FIG. 9, the tack is applied to the reverse surface at 906 and 908. The tack may help the item authentication label 700 to adhere to a surface to which it is affixed.

As another example, the glue is applied to the top side of the item authentication label 700 in areas 902 and 904 that correspond to the fingerprint item identifier 702 and digital identifier 704 and to the reverse side of the item authentication label 700 in area 910 that is positioned between the fingerprint item identifier 702 and digital identifier 704. In this way, removal of the top of the item authentication label 700 from a surface to which it was applied, such as a case, would result in the separation of the fingerprint item identifier 702 and the digital identifier 704 from the rest of the item authentication label 700.

As yet another example, the fingerprint item identifier 702 may be a dendritic structure, which may in some configurations may be composed of a metallic material. The fingerprint item identifier 702 may be supported by the label substrate 706, and potentially a protective layer that contacts the dendritic structure and the substrate and is positioned to enclose at least a portion of the dendritic structure. One or more of the adhesive materials may extend through an aperture in the substrate to contact the dendritic structure so that when the item authentication label 700 is applied to a surface article, a portion of the dendritic structure is bonded to the surface using the adhesive material. The substrate may include a first surface that contacts the dendritic structure, and a second surface opposite the first surface. The second surface may include depressions. The adhesive layer may include extensions that conform to the depressions formed in the second surface.

As yet another example, in FIG. 9, the tack pattern 908 on the reverse side of the fingerprint item identifier 702 is different from the glue pattern 904 on the top side of the 702, which in some configurations may help to destroy the integrity of the item authentication label 700. Upon separation, portions of the item authentication label 700 affixed to a first surface via glue (e.g., on the top side of the item authentication label 700) would stay affixed to the first surface. At the same time, portions of the item authentication label 700 not affixed to a first surface via glue but instead affixed to a second surface via tack (e.g., on the reverse side of the item authentication label 700) would stay affixed to the second surface. In this way, neither the top side of the item authentication label 700 nor the reverse side of the item authentication label 700 could be removed from a surface to which it was affixed without destroying the integrity of the item authentication label 700, and particularly destroying the integrity of the fingerprint item identifier 702 and the digital identifier 704 portions of the item authentication label 700.

In some embodiments, the label 700 may be configured so as to be folded over an item container and fuse together two different item case portions. Consider the example configuration shown in FIG. 8 and FIG. 9. In FIG. 8, the tack portion 906 of the reverse side of the label is removably pressed against the item container 806. The label 700 may then be folded over the item container 806, with the label 700 being permanently or semi-permanently attached to the item container 806 via the glue area 910 on the reverse side of the label. The tack portion 908 of the reverse side of the label may then be removably pressed against the back side of the item container 806. The case portions 808 and 810 may then be pressed against the front and back of the item container 806. In such a configuration, the glue portion 902 is permanently or semi-permanently attached to the front case portion 810, while the glue portion 904 is permanently or semi-permanently attached to the back case portion 810.

In the example configuration described in the preceding paragraph, the label 700 would then reveal an attempt to tamper with the sealed item container. For example, if the back case portion 808 were separated from the front case portion 810 after being pressed together and pressed against the glue portions 904 and 902 of the label 700, then the label 700 would tear along one or more of the die cuts 708, which may cause the portions of the label to separate and either the first identifier indicium 702 or the second identifier indicium 704 (or both) to be disrupted such that they are unable to be used for identification purposes. A human holding the item package 800 could also observe, by visual inspection, that the label has been tampered with. The item could then no longer be authenticated since reproducing the fingerprint identifier indicium 702 is impossible or impracticable.

In some embodiments, ultrasonic welding may be used instead of, or in addition to, one or more adhesive layers. For example, either the first unique indicium or the second unique indicium or both may be composed of cured ink having a lower melt point than other elements of the item authentication label 700. A low-cohesion adhesive such as tack may be used to initially position the label 700. Then, ultrasonic welding may be used to fuse the unique indicium to a surface such as the case portion 808 and/or the case portion 810. Thus, such a configuration may achieve a similar effect as glue.

Figure 10:
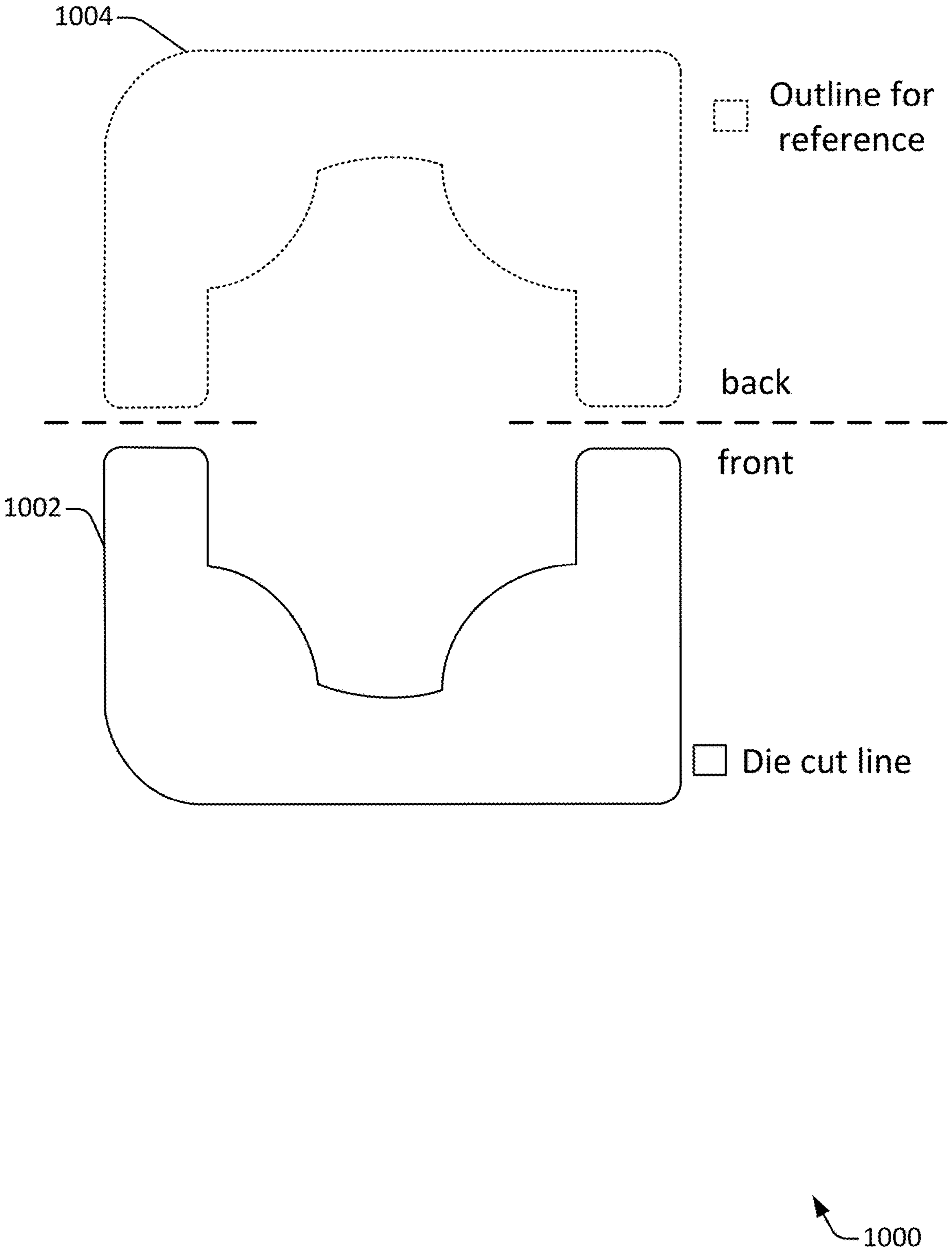
FIG. 10 illustrates a top-down view of a diagram of an item label, configured in accordance with one or more embodiments.

FIG. 10 illustrates a top-down view of a diagram of an item label 1000, configured in accordance with one or more embodiments. The item label 1000 has a different shape than is shown in other item label configurations described herein, but nevertheless has similar components. The front of the item label is shown at 1002, while the back of the item label is shown at 1004. The item label may be cut from a substrate, for instance via a die. The outline of the front of the item label 1002 shows the exterior die cut lines.

Figure 11:
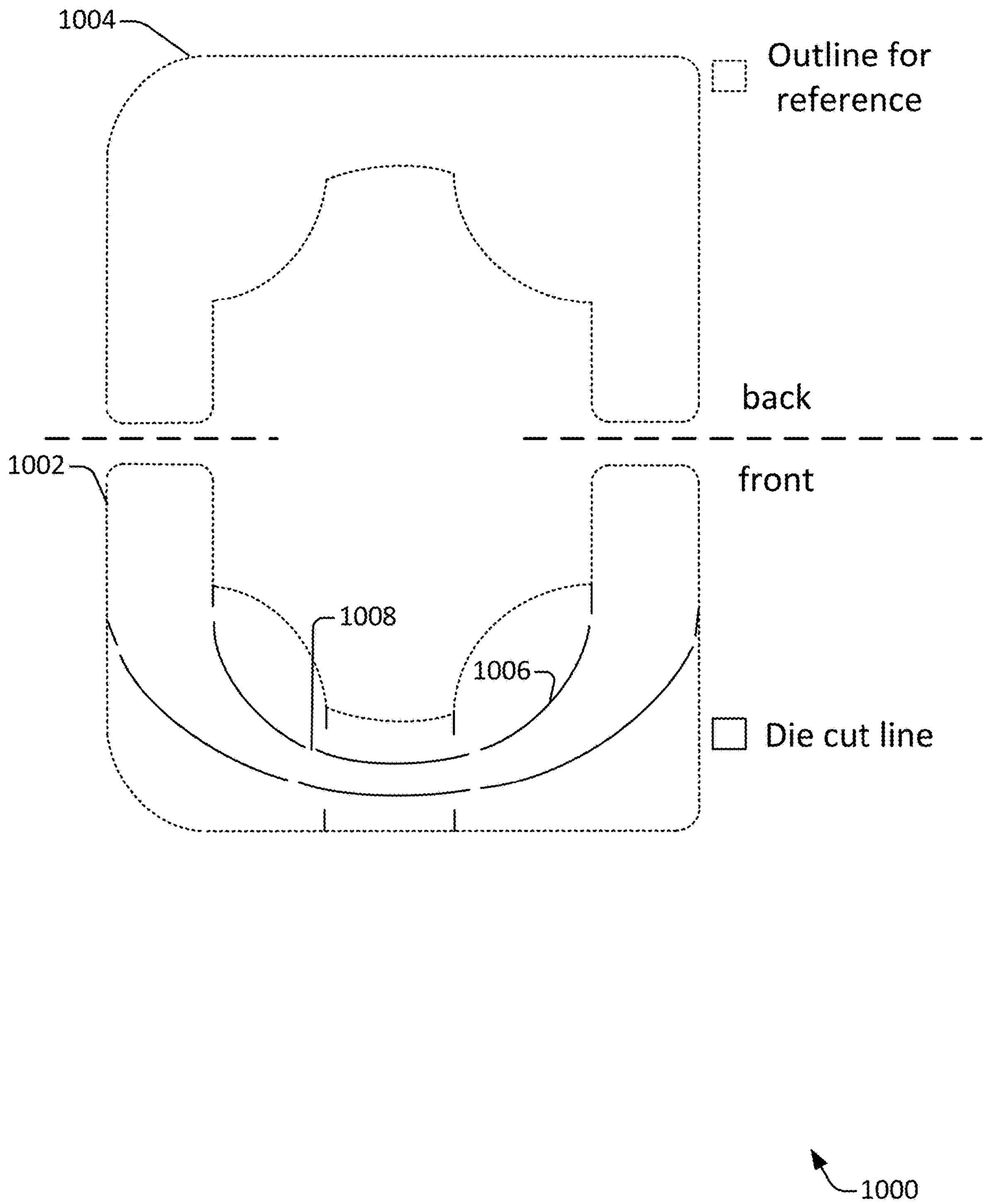
FIG. 11 illustrates another top-down view of a diagram of the item label, configured in accordance with one or more embodiments.

FIG. 11 illustrates another top-down view of a diagram of the item label 1000, configured in accordance with one or more embodiments. In FIG. 10, interior die cut lines are shown at 1006. According to various embodiments, the interior die cut lines facilitate tamper-detection. For instance, the interior die cut lines may have portions that are not cut, such as at 1008. Collectively, the interior die cut lines alone with the regions that are not cut, coupled with selectively applied adhesive illustrated in additional detail in subsequent figures, may cause the item label 1000 to selectively break away from an item to which it is adhered. For instance, when subjected to pressure, one part of the item label 1000 may be removed from the surface of the item more readily than another, with the interior die cut lines 1006 facilitating the easy removal of one portion and the adherence of another portion.

Figure 12:
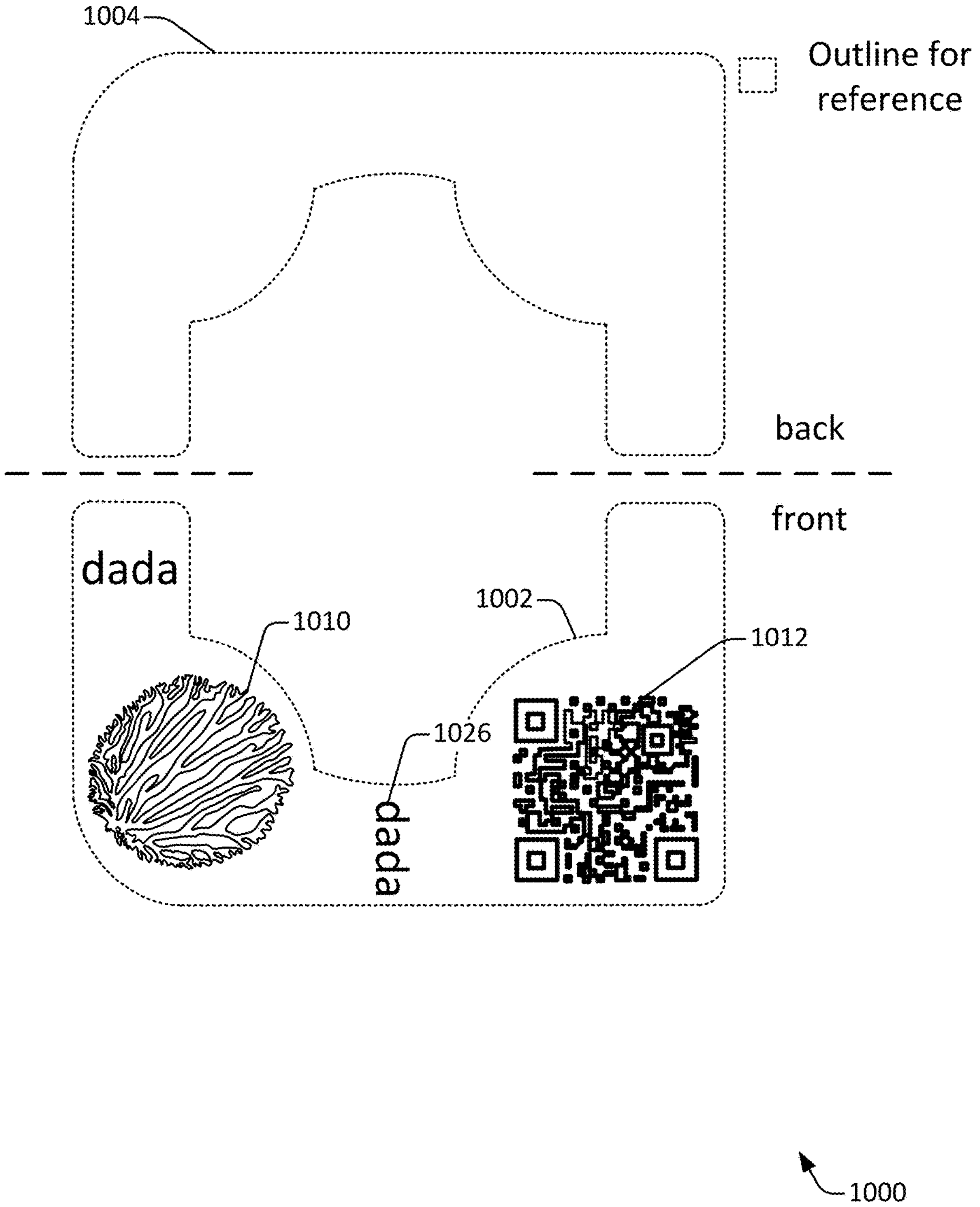
FIG. 12 illustrates another top-down view of a diagram of the item label, configured in accordance with one or more embodiments.

FIG. 12 illustrates another top-down view of a diagram of the item label 1000, configured in accordance with one or more embodiments. In FIG. 12, the indicia 1010, 1012, and 1026 have been printed on the front portion of the item label 1002. As discussed herein, the indicium 1010 is a stochastically produced visual pattern that is effectively impossible to reproduce with a degree of fidelity such that the reproduction would be identified as the original by a suitable scanning device. The indicium 1012 is a QR code used to access a database record corresponding to the item label. Because the database record links to another identifier determined based on the indicium 1012, collectively the indicia 1012 and 1010 uniquely identify the item label 1000, which effectively cannot be reproduced. The item label may include additional indicia such as the indicium 1026.

Figure 13:
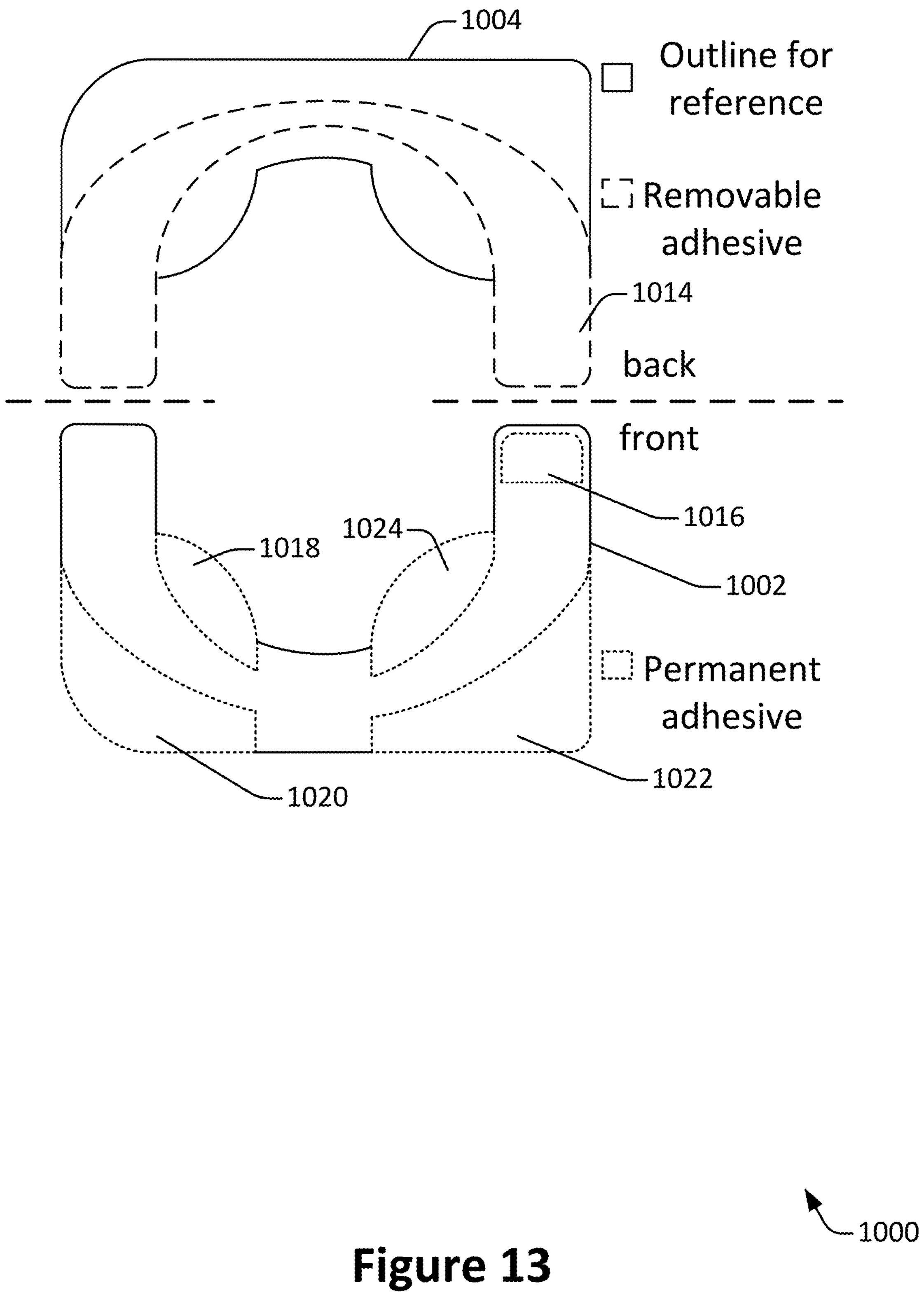
FIG. 13 illustrates another top-down view of a diagram of the item label, configured in accordance with one or more embodiments.

FIG. 13 illustrates another top-down view of a diagram of the item label 1000, configured in accordance with one or more embodiments. As shown in FIG. 13, regions of adhesive may be applied to both the front of the item label 1002 and the bottom of the item label 1004. For example, the region 1014 on the back of the item label, inside the region circumscribed by the interior die cut lines 1006, may be treated with adhesive. As another example, the region 1016, 1018, 1020, 1022, and 1024 may also be treated with adhesive. In this way, if the front portion of the item label 1002 and the back portion of the item label 1004 are pressed between two surfaces, the portion 1014 of the back of the item label would adhere to one surface and the portions 1016, 1018, 1020, 1022, and 1024 of the front portion of the item label would adhere to the other surface. Then, attempting to separate the two surfaces would cause the item label to split along the interior die cut lines 1006.

In some embodiments, some regions of adhesive may be stronger than others. For example, the portions of adhesive 1016, 1018, 1020, 1022, and 1024 on the front of the item label 1002 may be permanent or near-permanent adhesives, while the portion of adhesive 1014 on the back of the item label 1004 may be weaker adhesive designed to be more readily removed.

Figure 14:
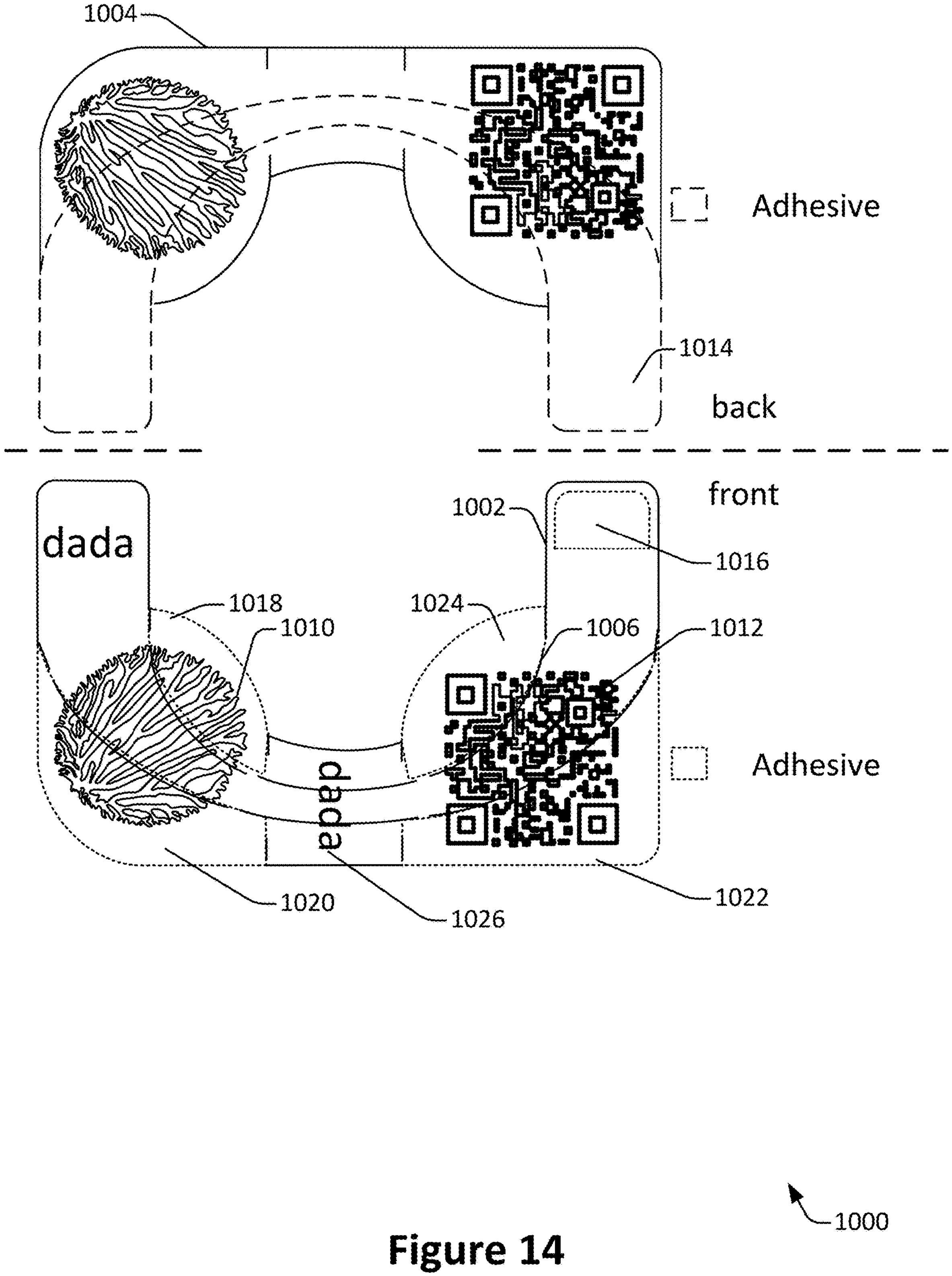
FIG. 14 illustrates another top-down view of a diagram of the item label, configured in accordance with one or more embodiments.

FIG. 14 illustrates another top-down view of a diagram of the item label 1000, configured in accordance with one or more embodiments. Specifically, FIG. 14 illustrates the various portions of the item label 1000, superimposed for the purpose of clarity. In FIG. 14, as shown herein, indicia are applied at 1010 and 1012.

In some embodiments, the interior die cut lines 1006 may traverse indicia printed on the item label, such as the indicia 1010, 1012, and 1026. In this way, attempting to separate the two surfaces between which the item label is positioned would cause the indicia to be broken, Further, because the indicium 1010 is difficult to reproduce, the item label itself would not be reproducible using conventional printing techniques. Indeed, so long as optical scanning techniques operate at higher resolution than printing techniques, which is generally the case, the item label 1000 is not reproducible at a degree of fidelity such that a scanner operating on the indicium 1010 could not identify differences between the indicia 1010 and a reproduction of indicium 1010.

According to various embodiments, techniques and mechanisms described herein may be applied to a variety of different item label configurations, as shown for instance in FIG. 15A through FIG. 16B.

Figure 15A:
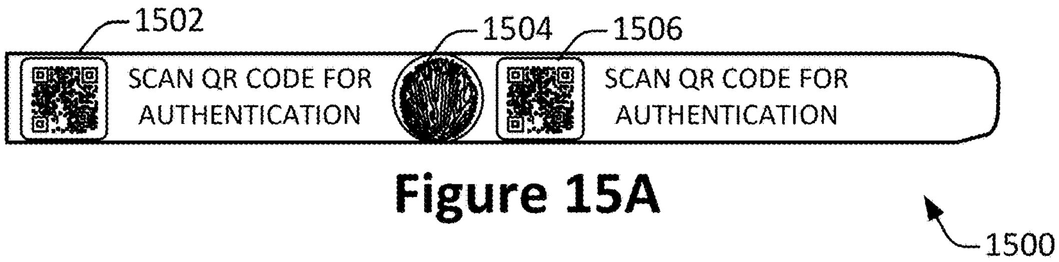
FIG. 15A, FIG. 15B, and FIG. 15C illustrate an item label band 1500, configured in accordance with one or more embodiments.
Figure 15B:
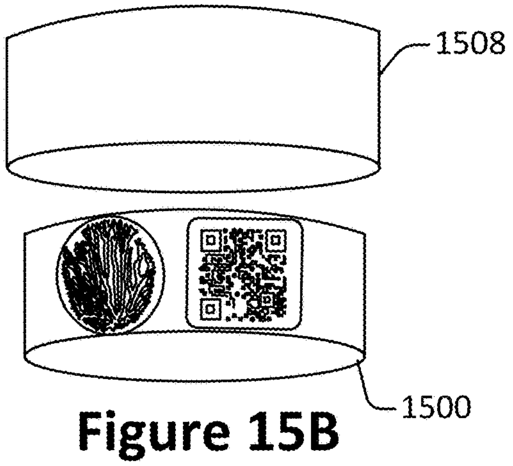
Figure 15C:
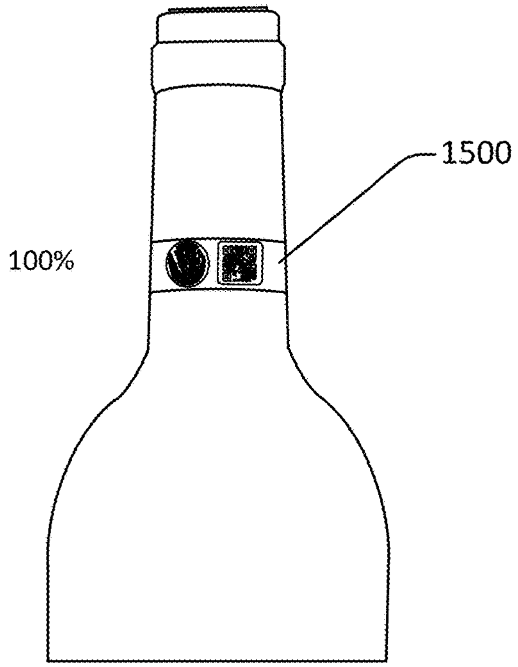

FIG. 15A, FIG. 15B, and FIG. 15C illustrate an item label band 1500, configured in accordance with one or more embodiments. The item label band 1500 may be printed on a flexible thermoplastic substrate. As shown in FIG. 15A, the reproducible indicium 1502 and 1506 may appear on the item label more than once. However, because the irreproducible indicium 1504 cannot be reproduced at a level of fidelity such that the difference between the original and the reproduction exceeds the detectability threshold of a camera, the irreproducible indicium 1504 appears only once on the item label 1500.

FIG. 15B shows the item band 1500 in a wrapped state, along with a clear foil layer 1508. In some embodiments, the item label 1508 may be configured with double-sided adhesive portions. Then, the clear foil layer 1508 may be joined with the item label 1500 via the adhesive.

Alternatively, or additionally, heat may be used in some embodiments to fuse the two layers. For example, once applied where the capsule and glass meet, it may be sealed with a clear foil 1508 that shrink wraps and crimps over the item label 1500 with moderate heat. In some configurations, such heat may transform a flexible thermoplastic to a hardened acrylic clear plastic to seal in the item label 1500.

FIG. 15C shows the item band 1500 wrapped around a wine bottle. Because the item label 1500 is permanently adhered to itself, the wine bottle cannot be opened and the item label 1500 cannot be removed without breaking the item label 1500.

In some embodiments, an additional tag may be included on the item label. For instance, an item label may be equipped with a tag that provides information regarding humidity, temperature, and/or other environmental characteristics that may be informative for items such as wine, medication, and cosmetics.

According to various embodiments, the item label may be applied to the alcohol bottle or other package such that opening or tampering with the item would be evident. For example, in the case of an alcohol bottle, the item label may be affixed to a lead, plastic, or foil capsule used to seal the cork, stopper, twist top, or other bottle cap. In such a configuration, the bottle could not be opened without first altering or removing the capsule. Further, the original capsule could not be replaced with a new capsule because the item label 1500 is irreversibly fused with the original capsule such that attempting to separate the two would destroy or damage the item label in a manner that would be apparent upon visual inspection. Additionally, attempting to separate the capsule from the bottle would also lead to the item label being altered in such a way that digital authentication attempts would fail.

According to various embodiments, although the item label 1500 is shown in FIG. 15C as being applied to an alcohol bottle, various configurations are possible. For example, the item label 1500 may be applied to a person's wrist to support efficient identification, for instance in a hospital, medical, or security context. As another example, the item label 1500 may be applied to another type of item, such as a handbag strap.

According to various embodiments, although an item label is described herein as being equipped with adhesives on both sides, in some configurations the item label may include adhesive on only one side, or on neither side. For example, external adhesives may be used to affix the item label to some types of items. As another example, the item label may include an adhesive on only one side, for instance in the configuration shown in FIG. 15A, and that adhesive may be used to affix part of the item label (e.g., one end) to itself (e.g., the other end). In either case, tampering with the item label would still be evident via either or both visual inspection or digital authentication attempts.

Figure 16A:
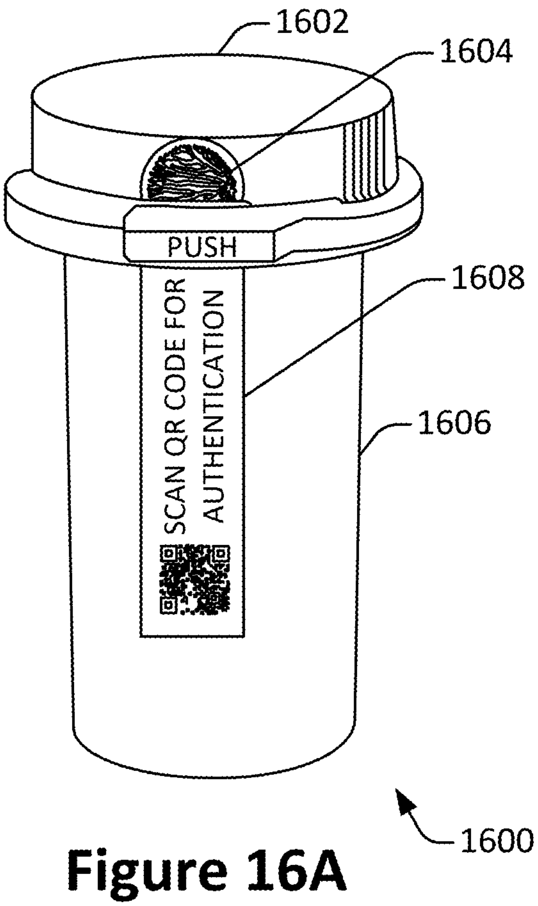
FIG. 16A and FIG. 16B illustrate a pharmaceutical vial 1600 to which an item label 1608 has been applied, configured in accordance with one or more embodiments.
Figure 16B:
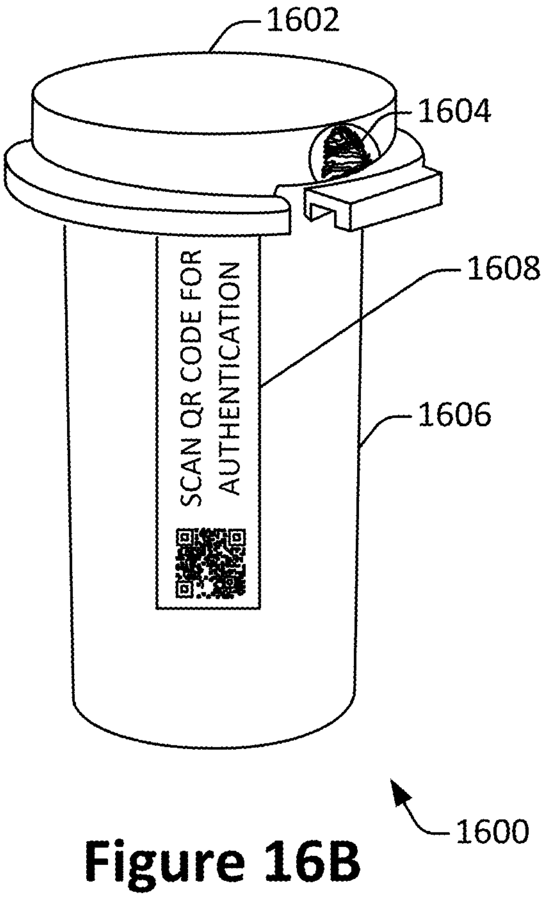

FIG. 16A and FIG. 16B illustrate a pharmaceutical vial 1600 to which an item label 1608 has been applied, configured in accordance with one or more embodiments. As shown in FIG. 16A, the item label is applied to adhere to both the cap 1602 and container 1606 with a strategically placed double-sided adhesive. As shown in FIG. 16B, twisting the cap 1602 to open the vial 1606 leads to the destruction of the irreproducible indicium 1604, since part of the irreproducible indicium 1604 rotates with the cap 1602 and part remains stationary with respect to the vial 1606.

According to various embodiments, a container configured for receipt of an item label may be arranged in any of various ways. For example, in FIG. 16A and FIG. 16B, a push button is used to release the cap 1602 for rotation and separation from the container 1606. Activation of the push button also severs the irreproducible indicium 1604. However, other configurations are possible. For instance, the container may be opened and/or the irreproducible indicium may be distorted or broken via a motion such as squeezing, pushing, twisting, another type of pressure, and/or combinations thereof. For example, some pharmaceutical containers are opened by a combination of downward pressure and rotational pressure exerted on the cap.

FIGS. 7 through 16B illustrate only a few examples of the configurations of the item label in accordance with techniques and mechanisms described herein, and the contexts in which such a label may be applied. For example, an item label may be applied to any suitable container such that opening the container destroys the irreproducible indicium. As another example, an item label may be applied to a luxury good, such as around a handbag strap, to provide evidence of the luxury good's authenticity.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C#, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A tamper-evident item authentication label comprising:

a substrate layer that includes a first substrate side and a second substrate side;

a first adhesive layer deposited on the first substrate side and arranged so as to fuse the tamper-evident item authentication label with a first surface;

a second adhesive layer deposited on the second substrate side and arranged so as to fuse the tamper-evident item authentication label with a second surface, wherein the first and second adhesive layers together include a first region composed of a first type of adhesive having a first level of cohesion, and wherein the first and second adhesive layers together include a second region composed of a second type of adhesive having a second level of cohesion greater than the first level of cohesion;

a first unique indicium deposited on the substrate layer and encoding a first unique identifier that links the tamper-evident item authentication label to one or more records in a remote database system;

a second unique indicium deposited on the substrate layer, the second unique indicium comprising a stochastic visual pattern; and a plurality of cuts extending across the first unique indicium and the second unique indicium through at least a portion of a thickness of the substrate layer.

2. The tamper-evident item authentication label recited in claim 1, wherein the first type of adhesive is a temporary tack layer adhesive.

3. The tamper-evident item authentication label recited in claim 1, wherein the second type of adhesive is a permanent glue layer adhesive.

4. The tamper-evident item authentication label recited in claim 1, the tamper-evident item authentication label further comprising:

a first cover layer removably attached to the first adhesive layer; and a second cover layer removably attached to the second adhesive layer.

5. The tamper-evident item authentication label recited in claim 1, the tamper-evident item authentication label further comprising:

a pocket disposed in an air-tight film, the pocket including an inert gas and a color-changing substance, the color-changing substance being of a first color when not exposed to air and changing to a second color different from the first color when exposed to air.

6. The tamper-evident item authentication label recited in claim 1, wherein the first adhesive layer is arranged in a first pattern, and wherein the second adhesive layer is arranged in a second pattern that is different from the first pattern, the first and second patterns being arranged to facilitate breakage across the first unique indicium and the second unique indicium.

7. The tamper-evident item authentication label recited in claim 1, wherein the second unique indicium comprises a dendritic structure including a plurality of members extending away from a common point of the dendritic structure to form a stochastically branched arrangement of the plurality of members.

8. The tamper-evident item authentication label recited in claim 1, wherein the second unique indicium is selected from a group consisting of: a microdot, a micromirror array, a pattern printed in optical ink with suspended crystals, a pattern printed in optical ink with suspended metallic flakes, a microtexture, a microstructure, a region printed using a dye that reveals the stochastic visual pattern, and a stochastic QR code pattern.

9. An item package comprising:

a first item case portion including a first surface;

a second item case portion including a second surface;

a tamper-evident item authentication label comprising:

a substrate layer that includes a first substrate side and a second substrate side;

a first adhesive layer deposited on the first substrate side and arranged so as to fuse the tamper-evident item authentication label with the first surface;

a second adhesive layer deposited on the second substrate side and arranged so as to fuse the tamper-evident item authentication label with the second surface;

a first unique indicium deposited on the substrate layer and encoding a first unique identifier that links the tamper-evident item authentication label to one or more records in a remote database system;

a second unique indicium deposited on the substrate layer, the second unique indicium comprising a stochastic visual pattern, wherein the first and second adhesive layers together include a first region composed of a first type of adhesive having a first level of cohesion, and wherein the first and second adhesive layers together include a second region composed of a second type of adhesive having a second level of cohesion greater than the first level of cohesion;

a plurality of cuts across the first unique indicium and the second unique indicium extending through at least a portion of a thickness of the substrate layer; and an item removably sealed between the first item case portion and the second item case portion.

10. The item package recited in claim 9, wherein the first type of adhesive is a temporary tack layer adhesive, and wherein the second type of adhesive is a permanent glue layer adhesive.

11. The item package recited in claim 9, the item package further comprising:

a pocket disposed in an air-tight film, the pocket including an inert gas and a color-changing substance, the color-changing substance being of a first color when not exposed to air and changing to a second color different from the first color when exposed to air.

12. The item package recited in claim 9, wherein the first adhesive layer is arranged in a first pattern, wherein the second adhesive layer is arranged in a second pattern that is different from the first pattern, the first and second patterns being arranged to facilitate breakage across the first unique indicium and the second unique indicium.

13. The item package recited in claim 9, wherein the second unique indicium comprises a dendritic structure including a plurality of members extending away from a common point of the dendritic structure to form a stochastically branched arrangement of the plurality of members.

14. The item package recited in claim 9, wherein the second unique indicium is selected from a group consisting of: a microdot, a micromirror array, a pattern printed in optical ink with suspended crystals, a pattern printed in optical ink with suspended metallic flakes, a microtexture, a microstructure, a region printed using a dye that reveals the stochastic visual pattern, and a stochastic QR code pattern.

15. The item package recited in claim 9, wherein the first unique indicium is composed of cured ink, and wherein the first unique indicium is attached to the first item case portion via ultrasonic welding.

16. A method comprising:

receiving from a remote computing device a request to authenticate an item based on sensor data determined by scanning a label affixed to the item;

determining a first identifier value based on a first unique indicium included on the label and captured in the sensor data;

determining a second identifier value based on a second unique indicium included on the label and captured in the sensor data, the second unique indicium comprising a stochastic visual pattern, wherein the first and second adhesive layers together include a first region composed of a first type of adhesive having a first level of cohesion, and wherein the first and second adhesive layers together include a second region composed of a second type of adhesive having a second level of cohesion greater than the first level of cohesion;

retrieving an item authentication record from a database table, the item authentication record including the first identifier value and a third reference identifier value, the item authentication record being uniquely identified by the first identifier value;

determining via a processor whether the second identifier value matches the third reference identifier value; and transmitting to the remote computing device a response message indicating authentication of the item upon determining that the second identifier value matches the third reference identifier value.

17. The method recited in claim 16, wherein the second unique indicium comprises a dendritic structure including a plurality of members extending away from a common point of the dendritic structure to form a stochastically branched arrangement of the members.

18. The method recited in claim 16, wherein the second unique indicium is selected from a group consisting of: a microdot, a micromirror array, a pattern printed in optical ink with suspended crystals, a pattern printed in optical ink with suspended metallic flakes, a microtexture, a microstructure, a region printed using a dye that reveals the stochastic visual pattern, and a stochastic QR code pattern.

* * * * *